(12) United States Patent
Sowa et al.

(10) Patent No.: US 7,840,009 B2
(45) Date of Patent: *Nov. 23, 2010

(54) METHOD AND APPARATUS FOR STORING AND DISTRIBUTING ENCRYPTION KEYS

(75) Inventors: Hans Christopher Sowa, Schaumburg, IL (US); Daniel J. McDonald, Cary, IL (US); David J. Chater-Lea, Crowthorne (GB); Scott James Pappas, Lake Zurich, IL (US); Jason Johur, Maidenhead (GB); Dennis Newkirk, West Chicago, IL (US); Randy Kremske, Woodstock, IL (US); Walter F. Anderson, Algonquin, IL (US); Glen B. Walton, Tadley (GB)

(73) Assignee: Motorola, Inc., Schaumburg, IL (US)

( * ) Notice: Subject to any disclaimer, the term of this patent is extended or adjusted under 35 U.S.C. 154(b) by 428 days.

This patent is subject to a terminal disclaimer.

(21) Appl. No.: 11/781,310

(22) Filed: Jul. 23, 2007

(65) Prior Publication Data

US 2008/0013740 A1    Jan. 17, 2008

Related U.S. Application Data

(62) Division of application No. 09/785,849, filed on Feb. 16, 2001, now Pat. No. 7,266,687.

(51) Int. Cl.
*H04L 29/06* (2006.01)
*H04L 9/14* (2006.01)
*H04L 9/16* (2006.01)

(52) U.S. Cl. .......... 380/270; 380/281; 380/284
(58) Field of Classification Search .......... 380/278, 380/279, 281, 272, 286, 284; 455/433
See application file for complete search history.

(56) References Cited

U.S. PATENT DOCUMENTS 4,841,433 A    6/1989    Hakim (Continued)

FOREIGN PATENT DOCUMENTS

EP    0658021 A    6/1995

(Continued)

OTHER PUBLICATIONS

Roelofsen, Security Issues for TETRA Networks, TETRA Conference, PTT Telecom/KPN Research 1998.

(Continued)

*Primary Examiner*—Gilberto Barron, Jr.
*Assistant Examiner*—Izunna Okeke
(74) *Attorney, Agent, or Firm*—Valerie M. Davis; Steven R. Santema

(57) ABSTRACT

A first infrastructure system device other than a mobile station generates key material and forwards the key material to a second infrastructure system device other than a mobile station. A determination is made as to whether a mobile station for which the key material is directed is active on the system, and if so the key material is forwarded to a base station where the mobile station is active. The base station forwards the key material to the mobile station.

18 Claims, 13 Drawing Sheets

U.S. PATENT DOCUMENTS

| | | | |
|---|---|---|---|
| 4,888,800 | A | 12/1989 | Marshall |
| 5,164,988 | A | 11/1992 | Matyas |
| 5,199,072 | A | 3/1993 | White |
| 5,329,573 | A | 7/1994 | Chang |
| 5,588,062 | A | 12/1996 | Altschuler |
| 5,661,806 | A | 8/1997 | Nevoux |
| 5,732,350 | A | 3/1998 | Marko et al. |
| 5,794,139 | A | 8/1998 | Mizikovsky |
| 5,812,955 | A | 9/1998 | Dent |
| 5,850,444 | A | 12/1998 | Rune |
| 5,889,861 | A | 3/1999 | Ohashi |
| 6,026,298 | A | 2/2000 | Lamb |
| 6,108,424 | A | 8/2000 | Pitiot |
| H1895 | H * | 10/2000 | Hoffpauir et al. ........... 455/433 |
| 6,128,389 | A | 10/2000 | Chan |
| 6,134,431 | A | 10/2000 | Matsumoto |
| 6,381,454 | B1 | 4/2002 | Tiedemann |
| 6,477,387 | B1 | 11/2002 | Jackson |
| 6,707,915 | B1 | 3/2004 | Jobst |
| 6,711,400 | B1 | 3/2004 | Aura |
| 6,876,747 | B1 | 4/2005 | Faccin |
| 6,889,328 | B1 | 5/2005 | Sanchez Herrero |
| 6,920,559 | B1 | 7/2005 | Nessett |
| 7,024,553 | B1 * | 4/2006 | Morimoto ................... 713/163 |
| 7,123,719 | B2 | 10/2006 | Sowa et al. |
| 7,266,687 | B2 | 9/2007 | Sowa et al. |
| 7,590,843 | B1 | 9/2009 | Khalil et al. |
| 2008/0013734 | A1 | 1/2008 | Sowa et al. |
| 2008/0013735 | A1 | 1/2008 | Sowa et al. |
| 2008/0013736 | A1 | 1/2008 | Sowa et al. |
| 2008/0013737 | A1 | 1/2008 | Sowa et al. |

FOREIGN PATENT DOCUMENTS

| | | |
|---|---|---|
| EP | 1011222 A2 | 6/1999 |
| EP | 1011222 A3 | 6/1999 |
| GB | 2344978 A | 6/2000 |
| WO | WO9727716 A | 7/1997 |
| WO | WO9917459 A | 4/1999 |
| WO | WO0041427 A | 7/2000 |
| WO | WO0048363 | 8/2000 |
| WO | WO0124560 A | 4/2001 |

OTHER PUBLICATIONS

Roelofsen, KPN Research, TETRA Security, Information Security Technical Report; vol. 5, No. 3 (2000) 44-54.

Terrestrial Trunked Radio (TETRA); Voice Plus Data (V+D); Part 7; Security EN 300 392-7.

Menezes AJ, et al. "Handbook of Applied Cryptography, Passage", Handbook of Applied Cryptography, CRC Press Series on Discrete Mathematics and its Applications, Boca Raton, FL, CRC Press, US, pp. 387, 389, 394-395, 497-499, 551-553, 578, 580 XP002274300 ISBN:0-8493-8523-7.

Menezes AJ, et al. "Handbook of Applied Cryptography, Key Management Techniques", Handbook of Applied Cryptography, CRC Press Series on Discrete Mathematics and its Applications, Boca Raton, FL, CRC Press US, pp. 570-572, XP002249713 ISBN:0-8493-8523-7.

Marcel Waldvogel, et al. "The Versakey Framework: Versatile Group Key Management" IEEE Journal on Selected Areas in Communications; IEEE Service Center, Piscataway, US, vol. 17, No. 9, Sep. 1999, SP011055017, ISSN: 0733-8716, p. 1619.

Asha Mehrotra, et al. "Mobility and Security Management in the GSM System and Some Proposed Future Improvements", Proceedings of the IEEE, New York, US, vol. 86, No. 7, Jul. 1998, XP011044053, ISSN:0018-9219, p. 1489 Right-Hand Column, Line 43 and p. 1491, Left-Hand Column, Line 44, Figure 13.

Terrestrial Trunked Radio (TETRA); Voice Plus Data (V+D); Part 7: Security 3 Definitions, Symbols and Abbreviations; 4.2 Air Interface Key Management Mechanisms; 4.5 OTAR Protocols; A.2 OTAR PDUS, ETSI EN 300392-7 V2.1.1, XX, XX, XP002224025, 2001.

Terrestrial Trunked Radio (TETRA); ETSI Standards, European Telecommunications Standards Institute, Sophia-Antipo, FR, vol. TETRA-6, No. V211, Dec. 2000, Cover, pp. 22-25 (ETSI EN 300 392-7 VS/1/1 (Feb. 2001) Updated As TETRA V+D) Part 7:Security; 153 Pages.

Philippe Cretaine, "Supplementary European Search Report," European Patent Office, Munich, Germany, Apr. 3, 2007.

Matthew Smithers, "PCT International Search Report and Written Opinion," WIPO, ISA/US, Commissioner of Patents, Alexandria, VA, USA, Jul. 16, 2002.

Matthew Smithers, "PCT International Preliminary Examination Report," WIPO, ISA/US, Commissioner of Patents, Alexandria, VA, USA, Dec. 27, 2002.

Philippe. Cretaine, "Examination Report—Office Action," European Patent Office, Munich, Germany, Nov. 7, 2007.

Grecas, et al., Towards the Introduction of the Asymmetric Cryptography in GSM, GPRS, and UMTS Networks, Proceedings of the 6th IEEE Symposium on Computers and Communication, Jul. 3-5, 2001, pp. 15-21. (XP10552509).

Notice of Allowance Dated Nov. 5, 2009 for Related U.S. Appl. No. 11/781,323.

US Office Action Dated Oct. 28, 2009 for Related U.S. Appl. No. 11/781,340.

US Office Action Dated Dec. 3, 2009 for Related U.S. Appl. No. 11/781,360.

US Office Action Dated Jan. 25, 2010 for Related U.S. Appl. No. 11/781,489.

Office Action for Related U.S. Appl. No. 11/781,489 Dated Jul. 30, 2010.

Office Action for Related U.S. Appl. No. 11/781,340 Dated May 26, 2010.

Office Action for Related U.S. Appl. No. 11/781,360 Dated Jul. 6, 2010.

Notice of Allowance for Related U.S. Appl. No. 11/781,310 Dated Jun. 9, 2010.

* cited by examiner

METHOD AND APPARATUS FOR STORING AND DISTRIBUTING ENCRYPTION KEYS

CROSS-REFERENCE TO RELATED APPLICATIONS

This application is a divisional of prior application Ser. No. 09/785,849, filed Feb. 16, 2001.

FIELD OF THE INVENTION

This invention relates to encrypted communications, including but not limited to air interface communication within secure communication systems.

BACKGROUND OF THE INVENTION

Encrypted voice and data systems are well known. Many of these systems provide secure communication between two or more users by sharing one piece of information between the users, which permits only those users knowing it to properly decrypt the message. This piece of information is known as the encryption key variable, or key for short. Loading this key into the actual encryption device in the secure communication unit is a basic requirement that allows secure communication to occur. To retain security over a long period of time, the keys are changed periodically, typically weekly or monthly.

Encryption is known to be performed on an end-to-end basis within a communication system, i.e., encrypting a message at the originating communication unit (also known as a mobile station), passing it transparently (i.e., without decryption) through any number of channels and/or pieces of infrastructure to the end user's communication unit, which decrypts the message.

The Terrestrial Trunked Radio (TETRA) communication standard is presently utilized in Europe (hereinafter TETRA Standard), with potential for expansion elsewhere. The TETRA Standard calls for air interface, also known as air traffic or over-the-air, encryption. Air interface encryption protects information on the air interface between the infrastructure and the mobile subscriber. The TETRA standard calls for an authentication center, also known as a key management facility or key management center, to generate, distribute, and authenticate encryption keys and users. The TETRA standard does not, however, specify how to implement an authentication center, nor how to generate, distribute, and authenticate key material to system devices or mobile stations for information traversing through the infrastructure or SwMI (Switching and Management Infrastructure), as it is referred to in the TETRA Standard.

The TETRA standard fails to provide definition to minimize burden to call processing and bandwidth, provide encryption and authentication in a manner tolerant to equipment faults, support wide-area communications, and to store keys for all communication units without undue storage burden at local sites.

Accordingly, there is a need for a method and apparatus for providing a secure infrastructure for a communication system that utilizes air interface encryption and generates, distributes, and authenticates encryption keys and users without causing undue burden to call processing, bandwidth, security, and storage.

DESCRIPTION OF A PREFERRED EMBODIMENT

The following describes an apparatus for and method of providing a secure infrastructure for a communication system that utilizes air interface encryption and generates, distributes, and authenticates encryption keys and users without causing undue burden to call processing, bandwidth, security, and storage. System devices are divided into groups or pools and encryption keys are defined to provide secure transfer of key material among the system devices.

Figure 1:
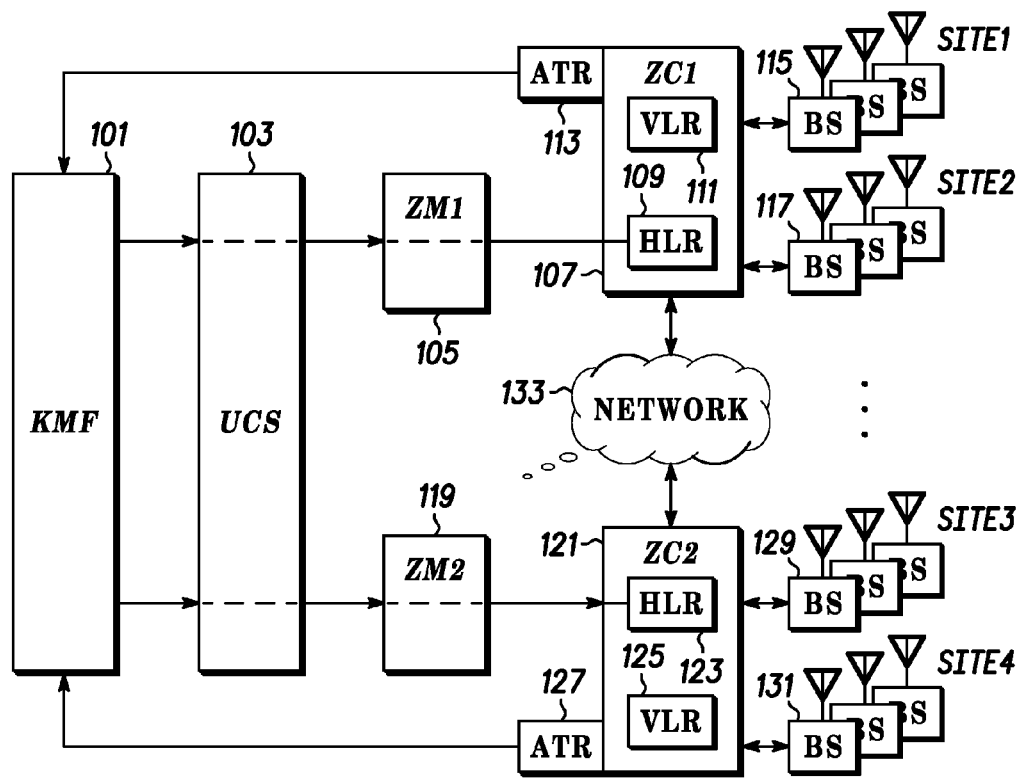
FIG. 1 is a block diagram of a secure communication system in accordance with the invention.

A block diagram of a secure communication system that is comprised of a plurality of zones is shown in FIG. 1. The secure communication system is comprised of a plurality of system devices that comprise the infrastructure of the system. A Key Management Facility (KMF) 101 transfers security data, such as session authentication information and encryption keys, to a User Configuration Server (UCS) 103, that forwards the information and data to the appropriate zone based on configuration data within the UCS 103. Communications for a first zone are provided by a plurality of system devices including a Zone Manager (ZM) 105, a Zone Controller 107 that includes a Home Location Register (HLR) 109 and a Visited (also known as a Visitor or Visitors') Location Register (VLR) 111, an air traffic router (ATR) 113, and a plurality of base stations (BSs) 115 and 117 located at a plurality of communication sites within the first zone. Communications for a second zone are provided by a plurality of system devices including a ZM 119, a ZC 121 that includes an HLR 123 and a VLR 125, an ATR 127, and a plurality of BSs 129 and 131 located at a plurality of communication sites within the second zone. The BSs 115, 117, 129, and 131 communicate with a plurality of mobile stations (see FIG. 4). The ZCs 107 and 121 communicate via a network 133, such as a local area network or a wide area network such as an IP (internet protocol) network. Only two zones and their associated system devices are shown for the sake of simplicity, although any number of zones may be successfully incorporated in the secure communication system.

For the sake of simplicity, not all system devices will be shown in each Figure, but rather a representative set of system devices that illustrates a particular concept will be provided. Similarly, not all key material is shown stored in each system device for the sake of space. Each message containing a key, key material, configuration, or other information is transferred with an related identity (ID) such as ITSI or GTSI, although the ID is generally not shown in the drawings for space considerations.

Figure 4:
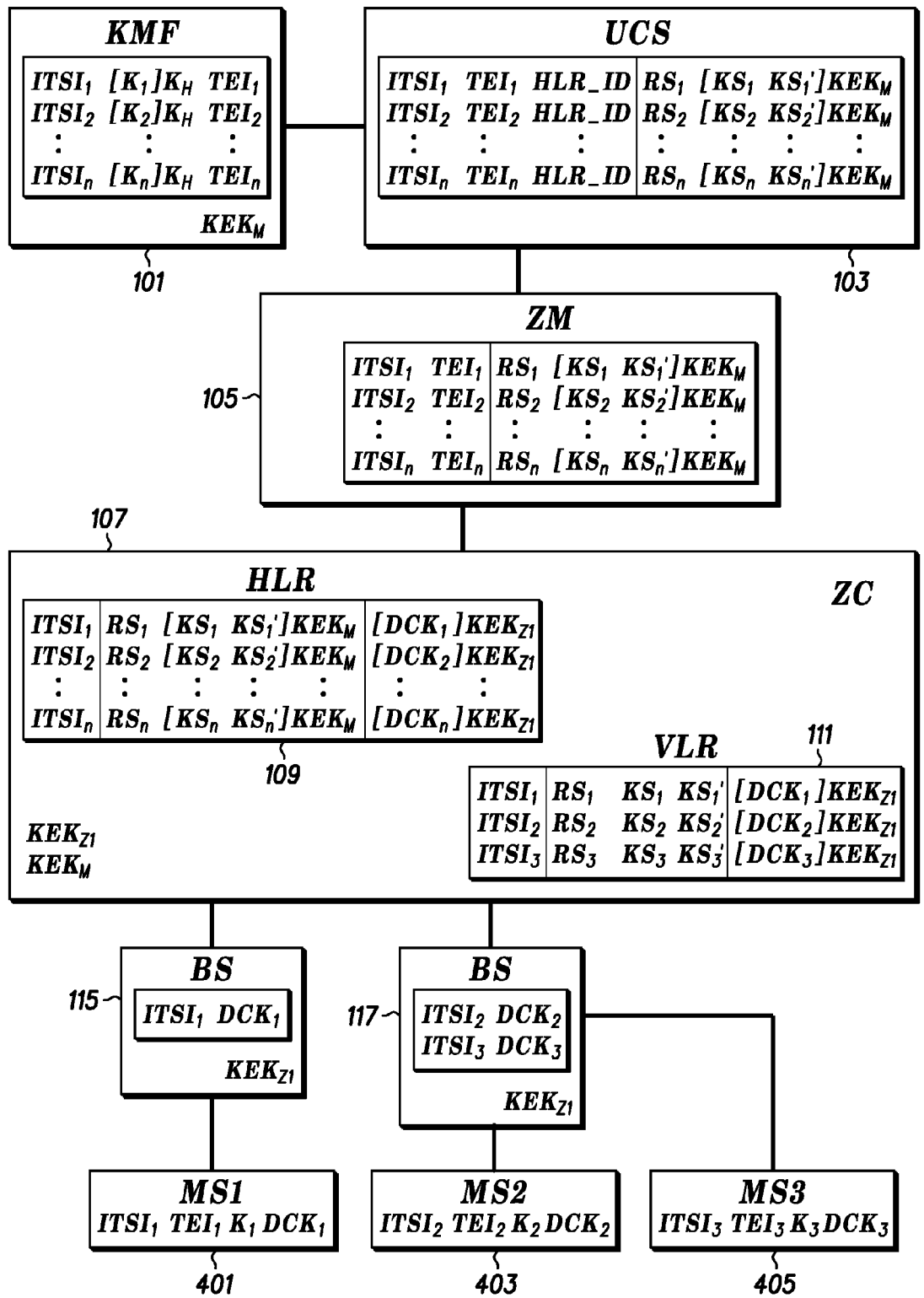

The KMF 101 is a secure entity that stores the authentication key (K) for each mobile station (MS) or communication unit, such as a portable or mobile two-way radio, Direct Mode Operation (DMO) gateway, receiver, scanner, or transmitter (for example, see devices 401, 403, and 405 in FIG. 4). The KMF 101 provides a random seed (RS) and associated session authentication keys (KS and KS') for each mobile station associated with the secure communication system. The KMF 101 also imports/generates various air interface keys, such as Static Cipher Key (SCK), Group Cipher Key (GCK), and Common Cipher Key (CCK), for distribution in the system. The KMF 101 functions as the authentication center (AuC), as referred to in the TETRA communication standard, in the system. Typically, there is one KMF server per system, although there may be one or more KMF clients per system.

The UCS 103 is a single point of entry for configuration data in the system. In the preferred embodiment, the UCS 103 stores and distributes session authentication information, such as RS, KS, and KS', to the appropriate home zone in the system. The UCS 103 functions as a non-real time distribution point for session authentication information in the system.

The ZM 105 or 119 is a management database for a zone. In the preferred embodiment, the ZM 105 or 119 stores session authentication information, such as RS, KS, and KS', for the zone managed by the particular ZM 105 or 119. The ZM functions as a non-real time storage facility for authentication information in the zone.

The ZC 107 or 121 performs real time authentication for the mobile stations in its zone. The ZC uses the session authentication information, such as RS, KS, and KS', to perform the real-time authentication. The HLR 109 or 123 stores session authentication information for each MS that has the HLR 109 or 123 as its home. The VLR 111 or 125 stores session authentication information for each MS visiting the VLR's 111 or 125 zone. The ZC 107 or 121 performs real-time distribution of its home mobile stations' session authentication information when the MS roams outside its home zone. In the preferred embodiment, an HLR 109 or 123 and VLR 111 or 125 are part of each zone controller and perform on behalf of the same zone for which the zone controller is associated. The HLR 109 or 123 and VLR 111 or 125 may be part of other system devices or may be stand alone devices.

The derived cipher key (DCK) is generated during authentication. The ZC 107 or 121 generates and distributes the DCK for the MS to the BSs 115, 117, 129, and 131 that require the DCK for secure communications.

The ATR 113 or 127 is the conduit used by the KMF 101 to send rekey messages or key updates to an MS, such as SCK and GCK. The KMF 101 sends key updates for mobile stations to the home zone ATR 113 or 127 for dissemination. All rekey acknowledgments (ACKs), whether infrastructure or MS originated, pass through the ATR 113 or 127 to the KMF 101.

Each BS 115, 117, 129, and 131 receives and transmits authentication messages over the air interface. Each BS 115, 117, 129, and 131 acts as a transmitter for its associated ZC 107 or 121 and as a receiver for the MS in the system. The BS 115, 117, 129, or 131 uses DCK for air interface encryption with the MS. The BSs 115, 117, 129, and 131 are responsible for sending key material to the MSs 401, 403, 405, and 407. The result of some of these operations (SCK, GCK) is sent back to the KMF 101. Because each base site is comprised substantially of one or more base stations, the terms base site (or site) and base station are used interchangeably herein, both sharing the acronym BS. In the preferred embodiment, a TETRA site Controller (TSC) connects all the base stations at a site, stores key material, and distributes key material to the base stations as needed, thereby making keys available to all base stations at a site. Thus, when a key is said to be stored at a base station or a base site, in the preferred embodiment, the TSC actually provides storage for the base station for key material. Because key storage and distribution and other key-related functions may be performed by a base site, base station, or TSC, these terms are considered interchangeable for the purposes of this document.

The Mobile Station (MS) authenticates the system and/or is authenticated by the system using a challenge-response protocol. Each MS has its own key, K, for use during authentication. Each MS is assigned to one HLR, which typically remains the same. Each MS is also associated with only one VLR in the zone in which the MS is presently located. An MS is not registered on a system until the MS is active and has passed authentication.

Figure 2:
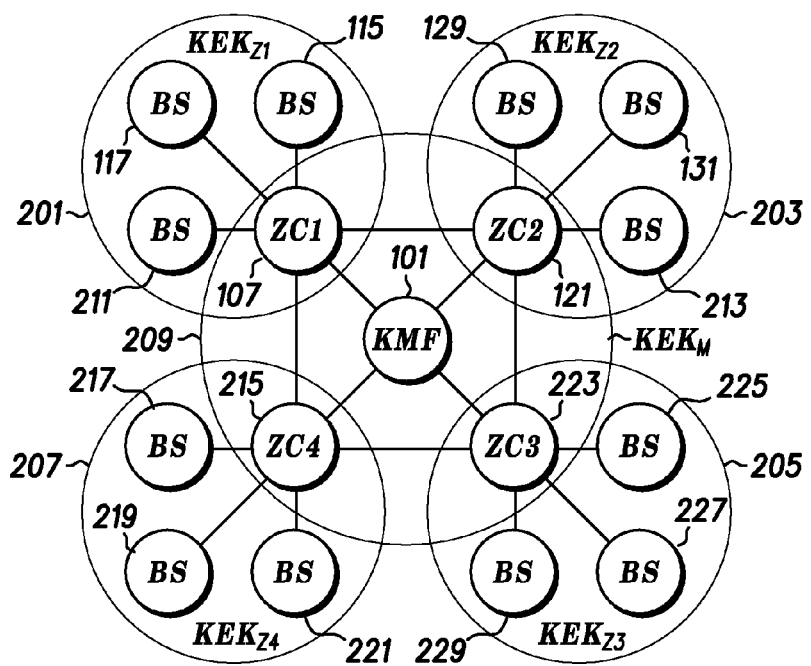
FIG. 2 is a block diagram showing key distribution pools in accordance with the invention.

FIG. 2 is a block diagram showing key distribution pools. Using a single key encryption key (KEK) to encrypt keys for distribution system wide is a convenient choice, although a single KEK would result in degraded security due to the higher likelihood that the KEK would be compromised and the resultant compromise would affect the whole system. Using a different KEK for each system device would be more secure, but would burden storage within system devices and add unnecessary delays to call processing. FIG. 2 shows a system for using KEKs that is more secure than a single system-wide key, yet not as burdensome as a different KEK for each system device. Two types of KEKs are assigned to confidentially distribute key material (such as air interface keys, session authentication information, data utilized to generate encryption keys, and other key-related material) to the system devices of the infrastructure of a system: intrakeys and interkeys. KEKs are 80 bits in the preferred embodiment.

The first type of KEK is an intrakey, also referred to as an intrapool key or intra-zone key, $KEK_Z$. The system devices are divided into pools or groups 201, 203, 205, and 207. Each pool is assigned its own unique intrakey, $KEK_Z$. In the preferred embodiment, each pool of devices corresponds to a zone in the communication system, and each pool has a mutually exclusive collection of system devices, i.e., each system device only belongs to one pool. The first pool 201 utilizes $KEK_{Z1}$ to encrypt key material, such as encryption keys and/or session authentication information, for transfer within the first pool (or zone in the preferred embodiment) and comprises the first zone controller ZC1 107 and its associated BSs 115, 117, and 211. The second pool 203 utilizes $KEK_{Z2}$ to encrypt key material for transfer within the second pool (or zone in the preferred embodiment) and comprises the second zone controller ZC2 121 and its associated BSs 129, 131, and 213. The third pool 205 utilizes $KEK_{Z3}$ to encrypt key material for transfer within the third pool (or zone in the preferred embodiment) and comprises the third zone controller ZC3 223 and its associated BSs 225, 227, and 229. The fourth pool 207 utilizes $KEK_{Z4}$ to encrypt key material for transfer within the fourth pool (or zone in the preferred embodiment) and comprises the fourth zone controller ZC4 215 and its associated BSs 217, 219, and 221. In the preferred embodiment, the intrakey is used by a zone controller to distribute key material to base sites/base stations within its zone. $KEK_Z$ is also used by the KMF 101 to distribute SCK.

The second type of KEK is an interkey, $KEK_M$, also referred to as an interpool key or inter-zone key. The interkey is used to encrypt key material sent between pools or zones in the preferred embodiment, or within a certain group 209 of system devices, particularly from the KMF 101. In the preferred embodiment, the interkey is used by the KMF 101 to distribute GCK and individual authentication information to the infrastructure. In the preferred embodiment, the interkey is stored in one system device in each zone, in each zone controller 107 and 121, and is also stored in the KMF 101. The connections shown between the KMF 101 and the zone controllers 107, 121, 215, and 223 are virtual connections in the preferred embodiment, in that other devices, such as the UCS 103 and ZMs 105 and 119, are physically located between the KMF 101 and zone controllers 107, 121, 215, and 223. The UCS 103 and ZMs 105 and 119 pass encrypted key information in a transparent manner between the KMF 101 and zone controllers 107, 121, 215, and 223, i.e., the UCS 103 and ZMs 105 and 119 do not decrypt or encrypt the information, thus no storage of a KEK is required at the UCS 103 and ZMs 105 and 119, although key material may be stored in encrypted form at the UCS 103 and ZMs 105 and 119.

Preferably, a message is encrypted by one of an intrakey and an interkey, typically using TA31 (decrypted using TA32), based on a system device to which the message is forwarded. For example, when the message is intended for a system device in a zone other than the zone containing the sending device, the interkey is used. When the message is intended for a system device in the same zone as the zone containing the sending device, the intrakey is used. In the preferred embodiment, when the KMF 101 encrypts key material, such as SCK, CCK, SAI, and GCK, with either the interkey or intrakey, the KMF 101 uses TA31.

For example, from time to time, key material is distributed from the HLR to a VLR and then to the base sites within the zone of the VLR. In this case, the key material is encrypted by $KEK_M$ and passed transparently from HLR to VLR. The target VLR decrypts the key material using its $KEK_M$ and re-encrypts it with the $KEK_Z$ of the zone for distribution to sites within the zone.

Each system device that contains an infrastructure KEK has its own unique infrastructure or protection key, KI, in the preferred embodiment. The protection key is only utilized to decrypt/encrypt KEKs sent by the KMF 101 to the infrastructure system devices. Preferably, the KI is only able to be loaded by a key variable loader and is not able to be updated with an OTAR (over-the-air rekey) operation. In addition to distribution by the KMF 101, the KEKs may also be manually provided with a Key Variable Loader. KI is 128 bits long in the preferred embodiment.

As shown in Table 1 below, $KEK_M$ is only stored by the zone controllers 107 and 121 and the KMF 101. The intrakey $KEK_Z$ is held only by the KMF 101, base stations/sites, and zone controller 107 and 121 within each zone. Each zone has a unique $KEK_Z$. Each system device has its own KI.

TABLE 1

Distribution of Key Encryption Key Types

| Infrastructure Element | Zone 1 | Zone 2 |
|---|---|---|
| Zone Controller (HLR, VLR) | $KI_1$, $KEK_M$, $KEK_{Z1}$ | $KI_2$, $KEK_M$, $KEK_{Z2}$ |
| Base Sites | $KI_3$, $KEK_{Z1}$ | $KI_4$, $KEK_{Z2}$ |

The use of intrakeys and interkeys strikes a unique tradeoff between security and key management complexity as well as speed of call processing. The KMF 101 need only maintain one interkey plus one intrakey for each pool or zone in the system. If a $KEK_Z$ is compromised, the affect and response is localized to that zone, rather than the whole system, and KI remains intact to redistribute a new $KEK_Z$ to that zone. $KEK_M$ is stored only at the KMF 101 and the HLR 109 and 123 and VLR 111 and 125 in each zone, which devices are typically more physically protected from an attack. If $KEK_M$ is compromised, the KMF 101 changes $KEK_M$ in the ZCs 107 and 121, leaving the sites unaffected.

Five basic types of air interface keys are used to encrypt air interface traffic in the secure communication system: a Static Cipher Key (SCK), a Common Cipher Key (CCK), a Group Cipher Key (GCK), a Derived Cipher Key (DCK), and a Modified Group Cipher Key (MGCK). Three basic types of keys are used between the system devices: an Infrastructure Key (KI) also known as a protection key, an inter-zone or inter-pool key encryption key also known as an interkey ($KEK_M$), and an intra-zone or intra-pool key encryption key also known as an intrakey ($KEK_Z$).

The Static Cipher Key (SCK) is the most basic of the air interface keys and is used to encrypt inbound (MS to infrastructure) and outbound (infrastructure to MS) information when authentication and/or dynamic air interface encryption is not available. Thus, the generation and distribution of this key has no relation to authentication.

The Derived Cipher Key (DCK) is a session key derived within the authentication procedure. The DCK changes each time an authentication is performed with the MS and the infrastructure, also called the SwMI in the TETRA Standard. The DCK is used for inbound traffic encryption. The DCK is also used for outbound individually addressed traffic to the MS. DCK is used when using dynamic air interface encryption operating in TETRA Standard security class 3.

This Common Cipher Key (CCK) is a group key in the sense that multiple MSs have the same CCK. Unlike the GCK, however, the CCK has no relation to a particular talkgroup (TG). The CCK is geographically specific, i.e., the CCK serves all units within a given location area. The location area as defined in the TETRA standard may be as small as a site or a big as an entire system. Each unit within a location area uses the same CCK. Group communications in the outbound direction use CCK when there is no GCK/MGCK available for that group call. CCK is used for the encryption of outbound group traffic and identities only. Inbound identities are encrypted with CCK when DCK is in use.

Indirectly, the Group Cipher Key (GCK) is used to encrypt outbound talkgroup calls. In the preferred embodiment, a GCK is defined for each talkgroup in the system. Actually, the GCK is only indirectly used for the encryption of traffic information; the modified group cipher key (MGCK), which is a derivative of the GCK, is directly used for traffic encryption. GCK is never used for the actual encryption of traffic as it is considered a long term key.

The Modified Group Cipher Key (MGCK) is used to encrypt outbound talkgroup call traffic. MGCK is formed by the combination of GCK and CCK. Each GCK has a corresponding MGCK defined in for a location area.

Each infrastructure element has an infrastructure or protection key, KI, that is used as the encryption key for any infrastructure key encryption key updates. KI is similar in function to the authentication key, K, in a mobile station. In the preferred embodiment, KI is updated only by a provisioning device such as a key variable loader. In the preferred embodiment, infrastructure key encryption key (KEK) updates cannot be performed without this key.

Each zone controller has an interkey, $KEK_M$, also referred to as an inter-zone or inter-pool key, which is used to encrypt all key traffic passed between the KMF and each zone. $KEK_M$ is also used by the zone controller to pass GCK, CCK, and DCK, as well as session authentication information, between zones. In the preferred embodiment, one $KEK_M$ is present in the KMF and each of the zone controllers in each system.

Each zone has its own intrakey, $KEK_Z$, also referred to as an intra-zone or intra-pool key. The intrakey is used to encrypt all key traffic within the zone, between the zone controller and each of the sites within the zones. Each base site and zone controller has the same $KEK_Z$ in a zone. The KMF stores the $KEK_Z$ for each zone in the system.

A method of the present invention establishes an expected lifetime, or rekey interval, for an encryption key. Table 2 below shows example rekey intervals for each key stored in the secure communication system. When the expected lifetime for an encryption key expires, i.e., when the rekey interval occurs, the encryption key is replaced.

A number of storage locations for each type of system device within a communication system is determined. For example, one KMF 101, one UCS 103, one ZM 105 or 119 per zone, one zone controller 107 or 121 per zone, one HLR 109 or 123 per zone, one VLR 111 or 125 per zone, and a number of sites and corresponding base stations per site depending on the coverage requirements for each zone. Based on the expected lifetime for each encryption key and the number of storage locations for each system device, a type of system device is assigned to store each encryption key, and the encryption keys are stored at the system device of the assigned type. For example, derived cipher keys are stored at base stations and in the HLR/VLR, common cipher keys are stored at base stations, modified group cipher keys are stored at base stations, and group cipher keys that are stored at HLRs and VLRs.

Table 2 shows the target (user) of each key and the rekey interval, i.e., time between changes or updates of the specific key in a preferred embodiment. For example, the MGCK, which is a combination of CCK and GCK, is updated whenever CCK is changes and whenever GCK is changed. Table 2 may be changed by the KMF operator.

TABLE 2

| | KEY TARGET | REKEY INTERVAL |
|---|---|---|
| SCK | All MS, all BS | 1 year/or if compromised |
| DCK | MS, BS, HLR, VLR | <24 hrs, whenever unit authenticates |
| CCK | group (TG HLR), all MS, all BS | 24 hrs |
| GCK | group (TG HLR) | 6 months |
| MGCK | group(BS, MS) | 24 hrs - Minimum of CCK, GCK interval |
| KI | All devices using $KEK_Z$ or $KEK_M$ (BS, ZC) | Never changes |
| $KEK_Z$ | zone | 6 months/or if compromised |
| $KEK_M$ | system | 6 months/or if compromised |

PC (personal computer) based software programs exist that provision both mobile stations and infrastructure system devices with keys. A more secure method utilizes the capabilities of the Key Variable Loader (KVL), or key loader for short, to load keys into the infrastructure devices as well as the MS. The key loader has a hardware based encryption device for the securing of keys stored within the device. The KVL may obtain keys directly from the KMF acting as a store and forward agent in order to disseminate the key encryption keys to the various devices.

Although a KVL is a very secure way to provide keys, it is a very time consuming process to use one or more KVLs to provide keys at each system device and mobile station. A method of key management is needed to store and distribute the KEKs and other key material to system devices such as zone controllers and base sites.

Figure 3:
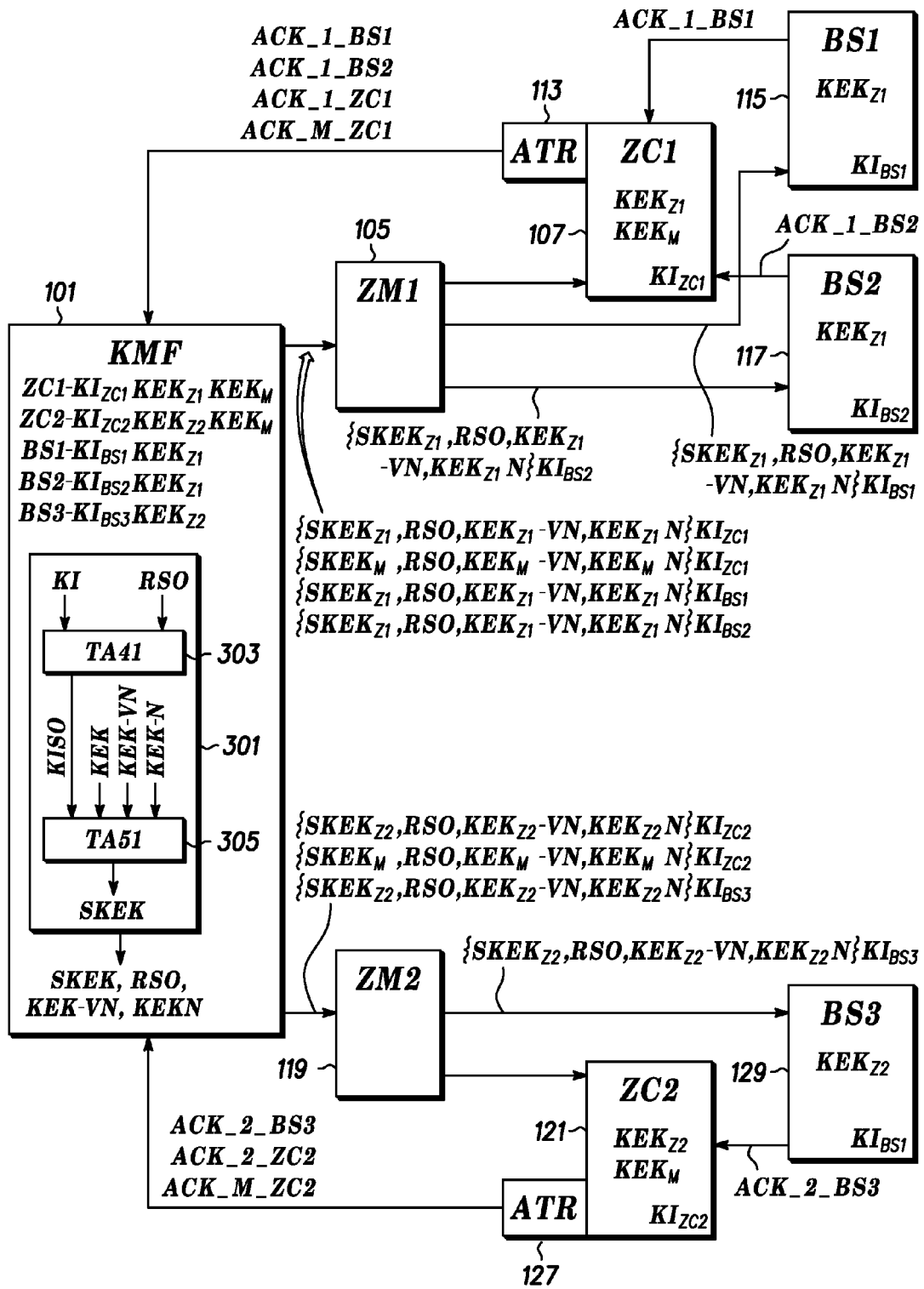
FIG. 3 and FIG. 4 are block diagrams showing key storage within a communication system in accordance with the invention.

The KMF 101 is responsible for the generation, key distribution, and tracking of most of the air interface keys (not DCK or MGCK) in the system. The base sites 115 and 117 and each zone controller 107 serve as a proxy to the KMF 101 for key distribution. The KMF 101 distributes key material to the zones through the UCS 103, ZMs 105 and 119, and/or ATRs 113 and 127 depending on the key being distributed. The KMF 101 processes acknowledgement information from the ATR 113 and 127 to maintain currency of the system devices and MSs 401, 403, 405, and 407. FIG. 3 and FIG. 4 show key material storage within the communication system.

As shown in FIG. 3, the KMF 101 stores a protection key and associated KEK(s) for each system device. The KMF 101 stores a protection (infrastructure) key, an interkey, and an intrakey for each zone controller. For example, the first zone controller 107 is associated with the keys $KI_{ZC1}$, $KEK_M$, and $KEK_{Z1}$. The KMF 101 stores these keys encrypted by a hardware key and the first zone controller 107 stores $KI_{ZC1}$ and the encrypted $KEK_M$ and $KEK_{Z1}$. The KMF 101 stores a protection key and intrakey, both protected by a hardware key, for each BS. For example, the KMF 101 and the first BS 115 both store the protection key $KI_{BS1}$ and the intrakey $KEK_{Z1}$. In the preferred embodiment, the KMF 101 stores keys encrypted/protected by a hardware key.

Figure 10:
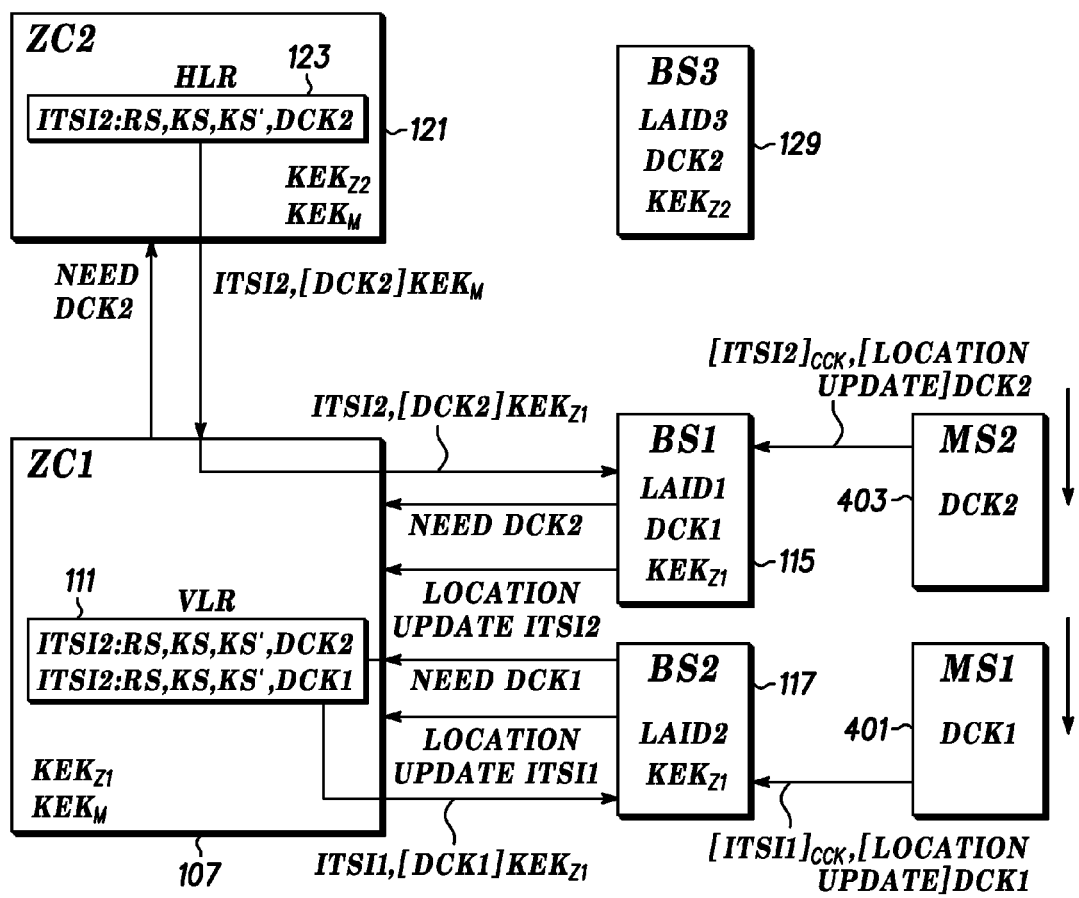
FIG. 10 is a diagram showing a key pull within a communication system in accordance with the invention.

Prior to distribution of a KEK in the preferred embodiment, the KMF 101 encrypts KEKs with the protection key, KI, and the use of encryption algorithms TA41 and TA51, similar to that shown in FIG. 10 titled "Distribution of SCK to an individual by an authentication centre" and its associated text in the Terrestrial Trunked Radio (TETRA); Voice plus Data (V+D); Part 7: Security, EN 300 392-7 V2.1.1, 2000-12 (herein referred to as "TETRA Standard"), which is incorporated in its entirety herein by reference. The KMF 101 stores an encryption process 301 that combines RSO and the appropriate KEK, KEKN, and KEK-VN utilizing encryption algorithms TA41 303 and TA51 305, yielding SKEK, which is a sealed version of the KEK. RSO, SKEK, KEKN, and KEK-VN are forwarded to the target system device. Curly brackets { } followed by a key name indicate that the material within the curly brackets was created using TA41 and TA51 and the key name after the brackets.

For example, $KEK_{Z1}$ is intended to be transferred to the first zone controller 107 and BS1 115. RSO, $KEK_{Z1}$, $KEK_{Z1}$-VN, and $KEK_{Z1}N$, and $KI_{ZC1}$ are combined utilizing encryption algorithms TA41 and TA51, yielding $SKEK_{Z1}$. Key material RSO, $SKEK_{Z1}$, $KEK_{Z1}$-VN, and $KEK_{Z1}N$ are forwarded transparently through ZM1 105 to the first zone controller 107, which combines this key material with $KI_{ZC1}$ using TA41 and TA52 (as described in the TETRA Standard), yielding $KEK_{Z1}$, which is stored at ZC1 107. RSO, $KEK_{Z1}$, $KEK_{Z1}$-VN, and $KEK_{Z1}N$, and $KI_{BS1}$ are combined utilizing encryption algorithms TA41 and TA51, yielding $SKEK_{Z1}$. Key material RSO, $SKEK_{Z1}$, $KEK_{Z1}$-VN, and $KEK_{Z1}N$ are forwarded transparently through ZM1 105 to BS1 115, which combines this key material with $KI_{BS1}$ using TA41 and TA52, yielding $KEK_{Z1}$, which is stored at BS1 115. In the preferred embodiment, an unencrypted acknowledgment of successful receipt of each key is returned to the KMF 101 via the ATR 113.

A block diagram showing key storage within a communication system is shown in FIG. 4. In particular, storage of session authentication information throughout the communication system is shown. In the preferred embodiment, session authentication information includes a random seed, RS, and two session keys, KS for authentication of an MS and KS' for authentication of the infrastructure, for each mobile station 401, 403, and 405 (only three are shown due to space constraints, although numerous MSs are part of the system). The session authentication information (SAI) is used to generate a derived cipher key (DCK) for each MS 401.

For each MS 401, 403, and 405, the KMF 101 stores an Individual TETRA Subscriber Identity (ITSI), TETRA Equipment Identity (TEI), and an MS authentication key ("MS key") that is unique to and stored within each MS 401, 403, and 405. In the preferred embodiment, the air interface keys and the MS keys are stored in hardware encrypted fashion using a hardware key $K_H$ within the KMF 101. The DVI-XL algorithm, available from Motorola, Inc., is used to encrypt the keys for storage in the KMF 101 in the preferred embodiment. Square brackets [ ] followed by a key name indicate that the material within the square brackets is encrypted by that key.

The KMF 101 generates session authentication information for each MS 401, 403, and 405, which SAI is at least partially encrypted and forwarded in non-real time to the UCS 103 for storage. For each MS 401, 403, and 405, the UCS 103 stores the ITSI, TEI, and ID of the HLR associated with each MS, as well as the SAI. In the preferred embodiment, KS and KS' are stored encrypted by the interkey (as received from the KMF 101) at the UCS 103 for fast and easy transport, and RS is stored unencrypted. The UCS 103 is a transparent device in the preferred embodiment, thus it performs no encryption or decryption functions. In order to eliminate potential double entry of information, the KMF 101 receives configuration information from the UCS 103. Examples of configuration information are: Individual TETRA Subscriber Identity (ITSI), Group TETRA Subscriber Identity (GTSI), home zone, and zone managers. The KMF uses a table lookup, such as a DNS (Domain Name Server) lookup table, to obtain the ATR 113 and 127 addresses. The distribution of each of the different key types has different configuration requirements, as described herein.

The UCS 103 forwards the appropriate SAI to each ZM 105 in non-real time, based on the HLR ID associated with each MS 401. The ZM 105, like the UCS 103, is a transparent device and performs no encryption or decryption functions. The ZM 105 stores, for each MS having the HLR 109 as its home location, an ITSI, TEI, and SAI. In the preferred embodiment, KS and KS' are stored encrypted by the interkey (as received from the UCS 103) at the ZM 105 or 119 for fast and easy transport, and RS is stored unencrypted.

The ZM 105 forwards the SAI to the HLR 109 in non-real time. The HLR 109 stores an ITSI and the SAI for each MS 401, 403, and 405. In the preferred embodiment, KS and KS' are stored encrypted by the interkey (as received from the ZM 103) at the HLR 109, and RS is stored unencrypted. In the preferred embodiment, RS, KS, and KS' are stored unencrypted at the VLR 111 for faster authentication. In an alternative embodiment, KS and KS' may be stored unencrypted at the HLR 109 for faster authentication.

When an MS 401 is authenticated at the zone, a new DCK for the MS 401 is generated by the VLR 111 at the zone controller 107 from the SAI in real time, after any encrypted SAI is decrypted due to transfer of the SAI from the HLR 109. (The ITSI, SAI, and previous DCK associated with that MS 401 are forwarded to the VLR 111 in real time before the new DCK is created.) The ITSI, SAI, and new DCK are forwarded to the HLR 109 in real time for storage. In the preferred embodiment, the ITSI, SAI, and DCK comes from the HLR for the MS 401, thus this information may come from a different zone if the MS 401 does not use the HLR 109 for its home. When the SAI/DCK comes from a different zone, that zone decrypts/encrypts the information, as necessary, with the interkey for transport to the appropriate zone, which also provides appropriate decryption/encryption within the zone. DCK is stored encrypted by the intrakey $KEK_Z$ for the zone in which it is stored, for easy and fast transport to the local BS 115 or 117. In the example shown in FIG. 4, each DCK is stored encrypted by $KEK_{Z1}$. In the preferred embodiment, KS and KS' are always encrypted with the interkey $KEK_M$, for fast and easy transport during the authentication process, even when transfer is within the same zone.

During the authentication process, the BS 115 communicating with the MS 401 receives, from ZC1 107 in real time, the MS's 401 DCK, encrypted by the intrakey $KEK_{Z1}$. The BS 115 stores the ITSI and DCK unencrypted for immediate use while the MS 401 is at the coverage area of the BS 115. See FIG. 17 and its associated text for information regarding key persistence at each site.

Each MS 401, 403, and 405 stores its own ITSI, TEI, and DCK in unencrypted form, and K is stored in scrambled or encrypted form. Each MS 401, 403, and 405 also stores in unencrypted form relevant CCKs, GCKs, MGCKs, and SCKs as they are received. These keys may be stored encrypted in the infrastructure in an alternative embodiment.

The zone controller 107 is responsible for the real time distribution of keys and mobility management thereof. It maintains keys that may need to be distributed in a real-time manner necessary when roaming, for example. The group cipher key is an element in each talkgroup record and is kept in the talkgroup HLR. The common cipher key is a zone or site specific key and is maintained in the zone controller as well. The ZC is responsible for the creation of the MGCK (based upon the GCK and CCK) and the distribution to the sites.

Because keys reside in the talkgroup and individual HLR 109, the zone controller 107 is not transparent with respect to the encryption of key material. The ZC 107 maintains a protection key, KI, and two infrastructure key encryption keys, interkey $KEK_M$ and intrakey $KEK_Z$, for the distribution of key material. KI is used to seal (encrypt) $KEK_M$ and $KEK_Z$ when they are sent from the KMF 101. Most key information is encrypted by the KMF 101 with the interkey, $KEK_M$. The zone controller 107 decrypts the key material using $KEK_M$ and re-encrypts the same information using $KEK_Z$ when sending the information to a site within the zone. Thus, the zone controller 107 has the TETRA algorithms used for the encryption/decryption of infrastructure keys (such as TA41 and TA52 and TA31 and TA32), as described herein.

The zone controller sends ACKs from infrastructure re-keying operations to the KMF 101 via the ATR 113. When a ZC 107 or HLR 109 receives a key update, the device first decrypts key update and checks for corruption by verifying the integrity of the data and sends the result of this operation to the KMF 101 via the ATR 113 in the form of an ACK.

The site is one endpoint for air interface encryption. Audio on the air interface between the BS 115 and MS 401 is encrypted. Audio within the infrastructure is not encrypted. Outbound traffic is encrypted with algorithms using MGCK, CCK, and SCK, or DCK for individual calls. All inbound traffic is encrypted with algorithms using DCK or SCK. The site maintains the traffic algorithms and key storage for SCK, CCK, and MGCK, as well as DCK. Because the base site has traffic key storage, the base site is not transparent with respect to the encryption of key material. All key material distributed to the base site is encrypted by the intrakey, $KEK_Z$. Thus, the base site maintains a protection key, KI, and an interkey, $KEK_Z$. Thus, the base sites have the TETRA algorithms used for the encryption/decryption of infrastructure keys (such as TA41 and TA52 and TA31 and TA32), as described herein.

The MS is the other endpoint point for air interface encryption. Outbound traffic is encrypted with algorithms using MGCK, CCK, and SCK, or the DCK if individually addressed. All inbound traffic is encrypted with algorithms using DCK or SCK, and identities may be encrypted with SCK or CCK. The MS maintains the traffic algorithms and key storage for SCK, CCK, GCK, and MGCK as well DCK.

The following figures provides examples of the role of the zone controller 107 or 121 in some of its key generation, key distribution, and authentication functions, as well as the base site/base station and MS operations in the key generation, key distribution, and authentication processes.

Figure 5:
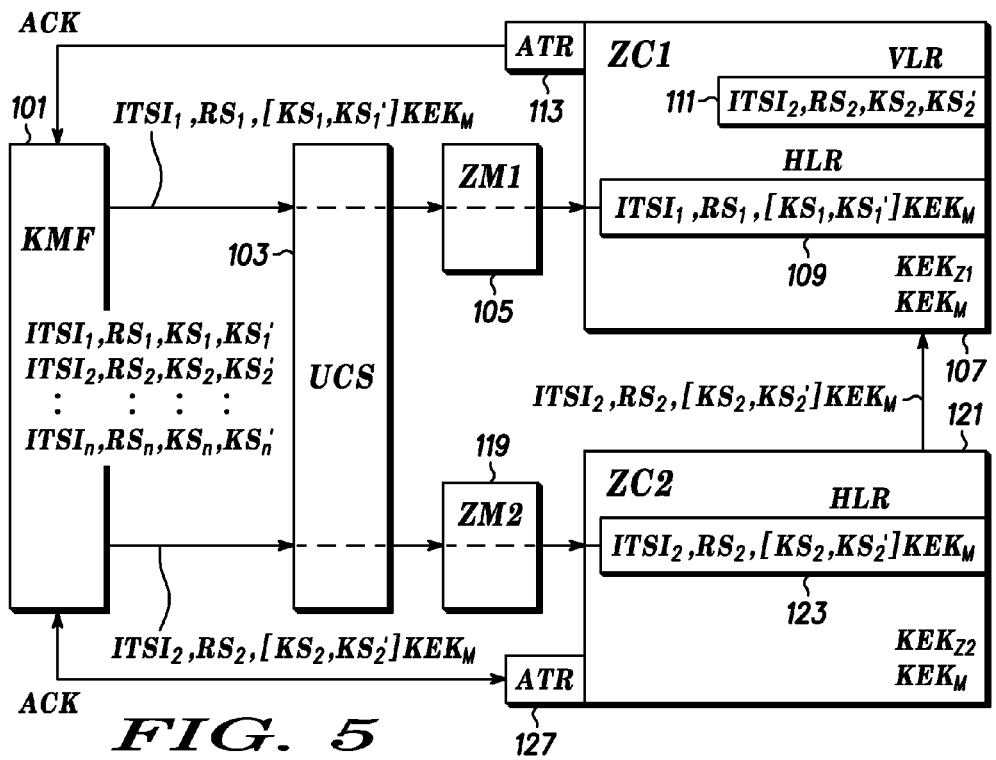
FIG. 5 is a diagram showing key storage and authentication information distribution within a communication system in accordance with the invention.

A diagram showing an example of key storage and authentication information distribution within a communication system is shown in FIG. 5. Session authentication information (RS, KS, and KS') is needed to facilitate real-time authentication of the MS 401 by the ZC 107 and real-time authentication of the system by the MS, as well as mutual authentication. Triggers for the transfer of SAI may be a manual initiation by the KMF operator, an automatic fraud trigger from the system, or a periodic changing of the SAI by the KMF 101.

FIG. 5 shows the transfer of SAI for two mobile stations, ITSI1 401 and ITSI2 403 (both not shown). The KMF 101 encrypts at least a part of the SAI (e.g., KS and KS') with the interkey $KEK_M$ for the system, and forwards ITS1, ITSI2, RS, and KS and KS' encrypted by $KEK_M$ to the UCS 103. The UCS 103 stores a copy and forwards it to the home ZM 105 or 119 for each ITSI. Dashed lines within a system device indicate transparent passage of information through the system device. The ZM 105 or 119 also stores a copy and forward it to its ZC 107 or 121, in particular, the HLR 107 or 123. The ZC 107 or 121 stores KS and KS' encrypted along with RS in the HLR 107 or 123. Once the HLR 109 or 123 receives the SAI, an unencrypted acknowledgement (ACK) is sent, when decryption using $KEK_M$ fails, back to the KMF 101 via the ATR 113 or 127 from the zone in which the HLR 109 or 123 resides. If a VLR 111 for the MS 403 exists, such as ITSI2, the ZC 121 sends KS and KS' encrypted with the interkey $KEK_M$ to the VLR 111. Coordination between a previous authentication session information and a new authentication session information is not needed. The HLR 109 or 123 only needs one copy of SAI per ITSI registered. The UCS 103 and ZM 105 or 119 store copies of authentication session information to provide recovery from system maintenance or failures.

By providing storage and forwarding of session authentication information and keys in non-real time (i.e., without time constraint) between first-level system devices and in real time (i.e., on demand) between second-level system devices as described above, the authentication system provides a fault tolerant system that allows for quick fault recovery as well. If the KMF 101, UCS 103, and/or ZMs 105 and 119 fail or are separated from the rest of the system, full authentication may still be performed without interruption on a real-time basis with the session authentication information, for example for MS2 403, stored at the HLR 123 and VLR 111. A failure at any of these devices 101, 103, 105, and 119 is not catastrophic, in that the data stored may be downloaded from any of the other devices that stores the information. If a zone controller 107, HLR 109, and/or VLR 111 experience a fault or failure, the SAI may be immediately downloaded from the ZM 105 at the zone. By eliminating the need for the KMF 101 to participate in real time in the authentication process, there is less burden on the KMF 101 and less traffic in general on the communication links between the system devices of the infrastructure.

Figure 6:
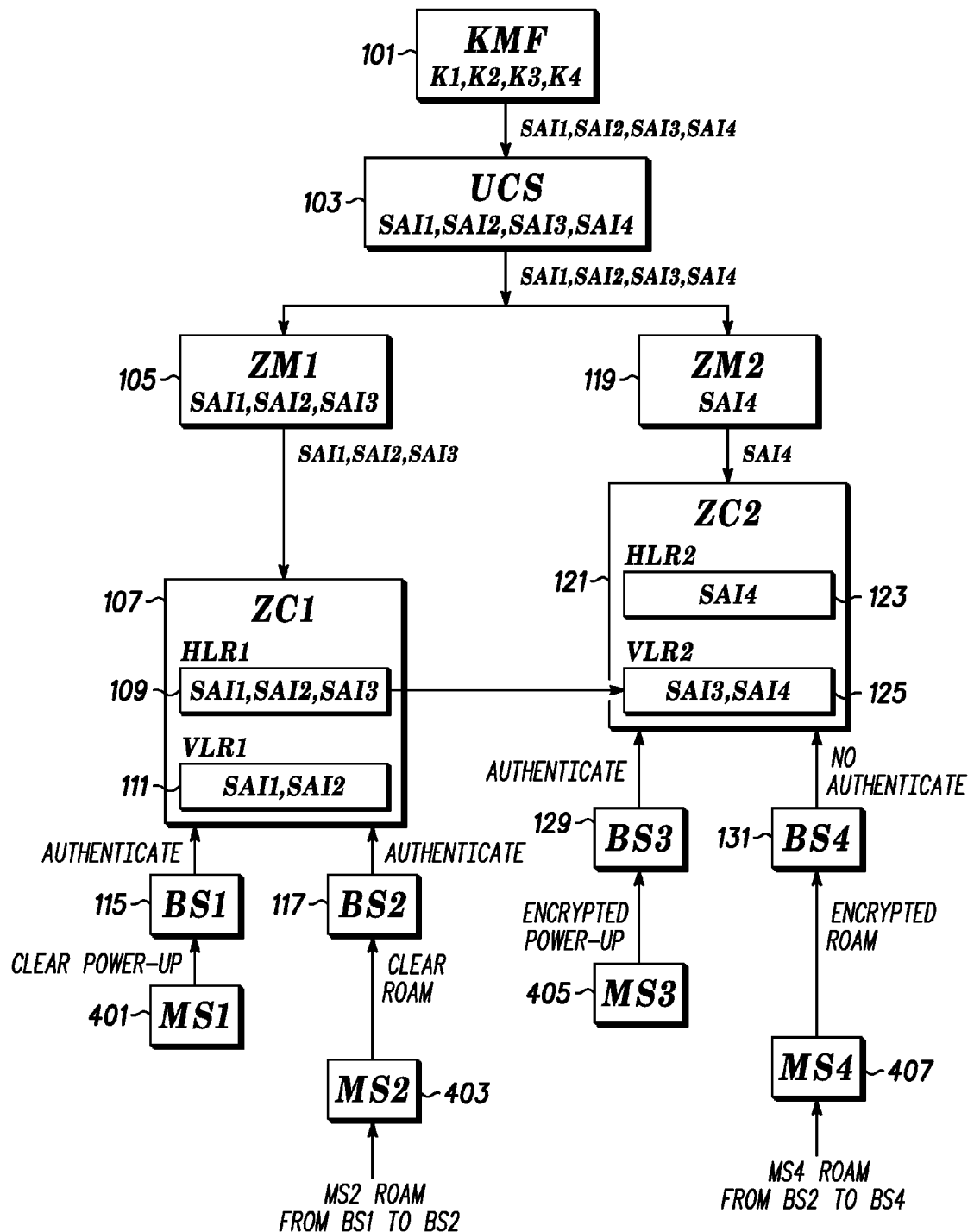
FIG. 6 is a diagram showing authentication information storage and authentication decision making within a communication system in accordance with the invention.

A diagram showing authentication information storage and authentication decision making within a communication system is shown in FIG. 6. Four mobile stations are shown within a system where three mobile stations 401, 403, and 405 use HLR1 109 of the first zone controller 107, one mobile station 407 uses HLR2 123 of the second zone controller 121, two mobile stations 401 and 403 use VLR1 111, and two mobile stations 405 and 407 use VLR2 125. Storage of SAI is shown throughout the system devices. Also shown are base station decisions whether or not to authenticate a mobile at a particular trigger. For example, power-up messages, whether encrypted or not, require authentication. Any message sent in the clear (i.e., unencrypted) requires authentication. Encrypted roam messages may be implicitly authenticated, i.e., the challenge and response mechanism may be bypassed if the encrypted roam message is successfully decrypted by the BS 131. Power-up messages, roam messages, location updates, and other types of messages are considered requests to communicate within the communication system. When authentication is required, the BS 115, 117, 129, or 131 sends a request to authenticate the MS to the infrastructure (to a zone controller in the preferred embodiment). In the event that the infrastructure device to which authentication requests are sent becomes unavailable, e.g., the device fails, is down for maintenance, or the communication link to the device is not operable, the BS stores authentication requests during the time period when the infrastructure device is not available. When the infrastructure device becomes available, e.g., the device is returned to service after a failure or maintenance or when the communication link comes up, the BS forwards the stored authentication requests to the infrastructure device.

In one situation shown in FIG. 6, a first MS 401 sends a clear (unencrypted) power-up message to the first BS 115. In the preferred embodiment, authentication of the MS 401 in this situation is required. Because the MS 401 uses HLR 109 in the zone where the BS 115 is located, the session authentication information SAI1 for the MS 401 is forwarded from the HLR 109 to the VLR 111 at the zone for completion of the authentication process.

The second MS 403 roams from BS1 115 to BS2 117 and sends a clear (unencrypted) roam message to the second BS 117. In the preferred embodiment, authentication of the MS 403 in this situation is required. Because the MS 403 uses the HLR 109 in the zone where the BS 115 is located, and because the MS 403 roamed from a site serviced by the same VLR as the new site, the session authentication information SAI2 for the MS 403 is already located in the VLR 111 at the zone for completion of the authentication process.

The third MS 405 sends an encrypted power-up message to the third BS 129. In the preferred embodiment, authentication of the MS 405 in this situation is required. Because the MS 405 uses the HLR 123 in the zone where the BS 129 is located, the session authentication information SAI3 for the MS 405 is forwarded from the HLR 123 to the VLR 125 at the zone for completion of the authentication process.

The fourth MS 407 roams from BS2 117 to BS4 131 and sends an encrypted roam message to the fourth BS 131. In the preferred embodiment, (full) authentication of the MS 403 in this situation is not required. Instead, the MS 407 is implicitly authenticated, i.e., the challenge and response mechanism is bypassed if the encrypted roam message is successfully decrypted by the BS 131. Because the MS 407 uses the HLR 109 in the zone other than the zone where the BS 131 is located, the encryption key (and if necessary, the session authentication information SAI4) for the MS 407 must be forwarded from that HLR 109 to the VLR 125 where the MS 407 has roamed for completion of the authentication process. Typically, at least a part of the SAI is encrypted by the interkey prior to transfer to another zone. If implicit authentication fails, full authentication of the MS 407 is then performed.

Figure 7:
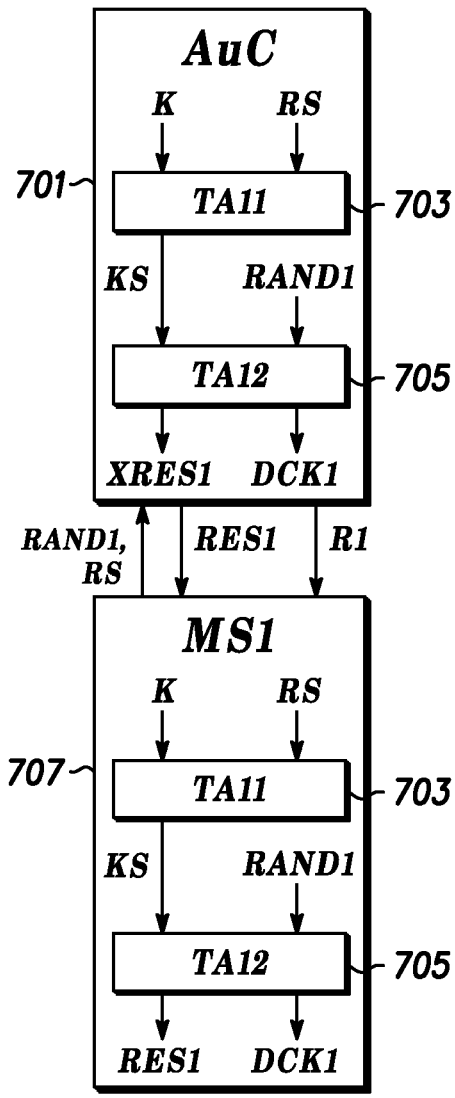
FIG. 7 is a diagram showing authentication of a mobile station by an authentication center in accordance with the TETRA Standard.

A diagram showing the challenge-and-response process to authenticate a mobile station by an authentication center in accordance with the TETRA Standard is shown in FIG. 7. When authenticating an MS 707, an authentication center 701, such as a KMF 101, combines the mobile authentication key, K, with RS utilizing the encryption algorithm TA11, as defined in the TETRA Standard. The output of the TA11 process 703 is KS, which is input with RAND1 (a random number) to the encryption algorithm TA12, as defined in the TETRA Standard. The TA12 process 705 outputs XRES1, an expected response, and DCK1, a derived cipher key for the mobile. RAND1 and RS are provided to the MS 707. The MS 707 goes through a similar process, by combining its mobile authentication key, K, with RS received from the AuC 701 utilizing the TA11 process 703. The TA11 process 703 outputs KS, which is input with RAND1 to the TA12 process 705. The TA12 process 705 in the MS 707 outputs RES1, a response to the challenge, and DCK1, the derived cipher key for the mobile. The MS 707 forwards RES1 to the AuC 701. If XRES1 and RES1 match, the AuC 701 sends an authentication pass message to the MS 707, and communication over the air interface with the newly created DCK1 may commence. If XRES and RES do not match, the AuC 701 sends an authentication fail message to the MS 707, and communication over the air interface with the newly created DCK1 is prohibited, although the old DCK1 may be used upon authentication failure.

Figure 8:
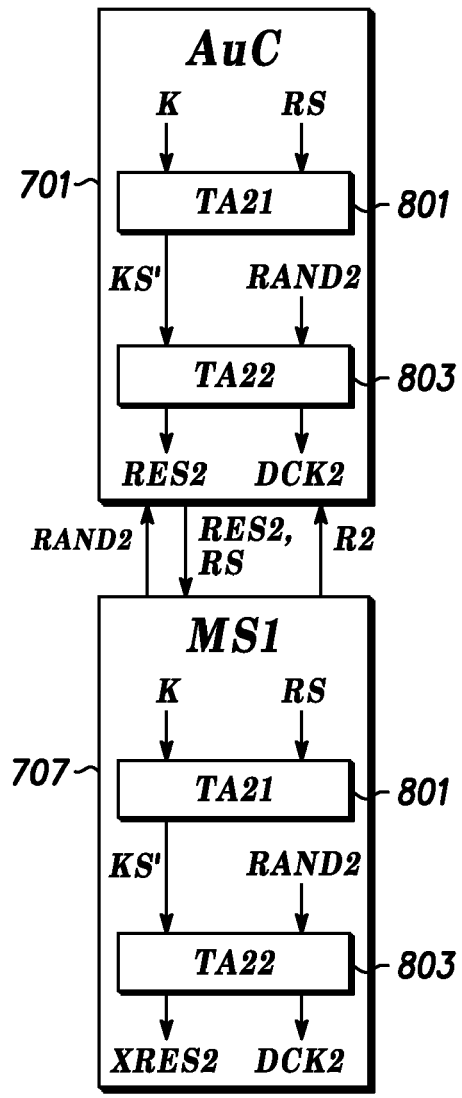
FIG. 8 is a diagram showing authentication of an authentication center by a mobile station in accordance with the TETRA Standard.

A diagram showing the challenge-and-response process to authenticate an authentication center by a mobile station in accordance with the TETRA Standard is shown in FIG. 8. When authenticating an AuC 701, such as a KMF 101, an MS 707 combines the mobile authentication key, K, with RS utilizing the encryption algorithm TA21, as defined in the TETRA Standard. The TA21 process 801 outputs KS', which is input with RAND2 (a random number) to the encryption algorithm TA22, as defined in the TETRA Standard. The TA22 process 803 outputs XRES2, an expected response, and DCK2, a derived cipher key for the mobile 707. RAND2 is provided to the AuC 701. The AuC 701 goes through a similar process, by combining the mobile authentication key, K, for the MS 707 with RS utilizing the TA21 process 801. The TA21 process 801 of the AuC 701 outputs KS', which is input with RAND2 to the TA22 process 803. The output of the TA22 process 803 in the AuC 701 is RES2, a response to the challenge, and DCK1, the derived cipher key for the mobile. The AuC 701 forwards RES and RS to the MS 707. If XRES and RES match, the MS 707 sends an authentication pass message to the AuC 701, and communication over the air interface with the newly created DCK1 may commence. If XRES and RES do not match, the MS 707 sends an authentication fail message to the AuC 701, and communication over the air interface with the newly created DCK1 does not take place.

Figure 9:
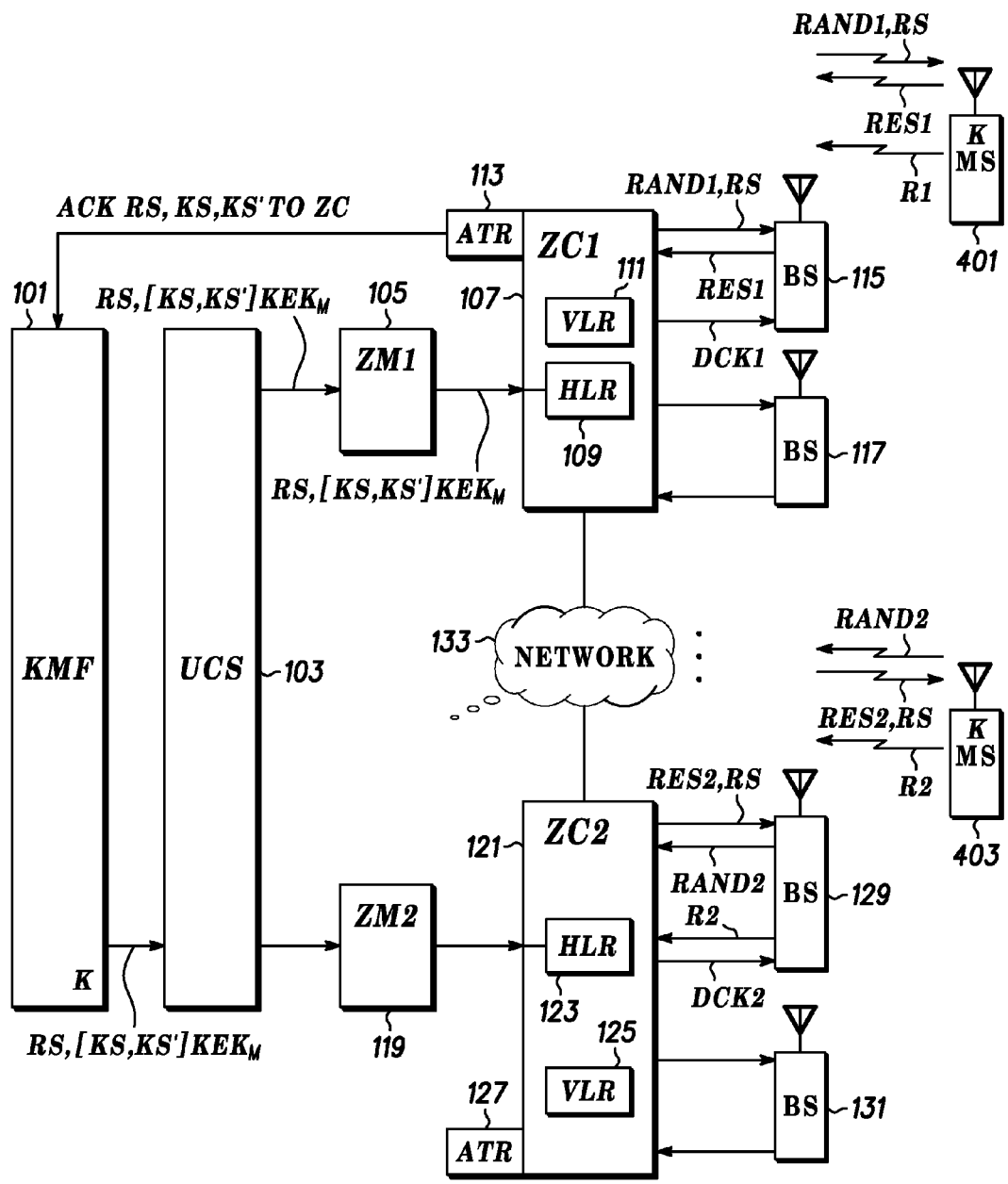
FIG. 9 is a diagram showing key storage and authentication information distribution between a communication system and a mobile station in accordance with the invention.

A diagram showing SAI distribution and the authentication process between a communication system and a mobile station in real time in accordance with the invention is shown in FIG. 9. FIG. 9 shows an implementation of the authentication process of the TETRA Standard including how various system devices within the infrastructure perform within the authentication process. FIG. 9 shows how the ZC 107, including the HLR 109 and VLR 111, and BS 115 act as proxies, or authentication agents, for the KMF 101 in the authentication process. In non-real time, KS and KS' encrypted by the interkey, and RS are passed along from the KMF 101 to the UCS 103, to the first ZM 105, and to the HLR 109 of the first zone controller 107.

After the BS 115 sends a request for authentication of the MS 401 to the ZC 107, the VLRK 111 generates RAND1 and uses KS and RAND1 with the TA12 process to generate XRES1 and DCK1, in accord with FIG. 7 herein, and forwards RAND1 and RS to the BS 115, which forwards RAND1 and RS over the air to the MS 401. The MS 401 combines its own K and RS with the TA11 process to generate KS, then combines RAND1 and KS in accord with FIG. 7 herein, yielding RES1 and DCK1, and forwards RES1 to the BS 115, which forwards RES1 to the VLRK 111 at the ZC 107. The VLR 111 compares RES1 and XRES1, and the result is R1. When RES1 and XRES1 match, DCK1 and the SAI for the MS 401 are stored in the VLRK 111 and HLR 109 and DCK1 (encrypted by the interkey). In the preferred embodiment, DCK1 is encrypted with the intrakey for the first zone prior to being sent to the BS 115. R1 is forwarded to the BS 115 in acknowledgment that authentication passed, and the BS 115 stores DCK1 and sends R1 to the MS 401 indicating authentication has passed. When RES1 and XRES1 do not match, the VLR 111 discards the newly created DCK1 without storing or forwarding to the BS 115 and forwards R1, a negative acknowledgment of the authentication process, to the BS 115, and the BS 115 sends R1 to the MS 401 indicating authentication has failed.

To request authentication of the infrastructure, the MS 403 sends RAND2 to the BS 129, which forwards RAND2 to the VLR 125 in the ZC 121. The VLR 125 looks up RS and KS' and generates RES2 and DCK2 using the TA22 process in accord with FIG. 8 herein, and forwards RES2 and RS to the BS 129, which forwards RES2 and RS over the air to the MS 403. The MS 403 combines RS and its own K with process TA21, yielding KS', which is then combined with RAND2 in the TA22 process in accord with FIG. 8 herein, yielding XRES2 and DCK2. The MS 403 compares RES2 and XRES2. When RES2 and XRES2 match, the MS 403 sends message R2 to the BS 129 in acknowledgment that authentication passed, the BS 129 sends R2 to the ZC 121, and the VLR 125 causes DCK2 and the SAI for the mobile 403 to be stored in the VLR 125 and the HLR 123 for the MS 403 and forwards DCK2 to the BS 129, which stores DCK2. In the preferred embodiment, DCK2 is encrypted with the intrakey for the second zone prior to being sent to the BS 129. When RES2 and XRES2 do not match, the MS 403 sends message R2 to the BS 129 indicating that authentication failed, the BS 129 sends R2 to the ZC 121, and the VLR 125 discards the newly created DCK2 without sending it to the BS 129.

In either authentication process, if the VLR 111 in the zone where the MS 401 or 403 is presently located does not have SAI stored for the MS 401 or 403, the VLR 111 obtains the SAI from the HLR for the MS 401 or 403. When the HLR 109 for the MS 401 or 403 is in the same zone, the SAI is simply passed within the ZC 107 to the VLR 111. When the HLR 109 for the MS 401 or 403 is in a different zone, the zone for the home HLR is determined from a home zone mapping table that maps ITSI to its Home Zone, and the SAI is forwarded to the ZC 107 to the VLR 111. In the preferred embodiment, when the key material is forwarded from the HLR for the MS 401 or 403 to the VLR 111, at least some of the SAI, in particular KS and KS', are encrypted with the interkey. When DCK is transferred within a zone, DCK is encrypted with $KEK_Z$. Similarly, if the zone where authentication takes place is not the home zone for the MS 401 or 403, updated SAI and DCK information will be inter key encrypted, at least in part, and forwarded to the appropriate VLR. As keys are passed between devices that require a different encryption key, one device receives a message, decrypts it with one key, and re-encrypts the result with another key for the next device.

Mutual authentication, when the MS and infrastructure mutually authenticate each other, is described with respect to FIG. 3 titled "Mutual authentication initiated by SwMI" and FIG. 4 titled "Mutual authentication initiated by MS" and their associated text of the TETRA Standard. The resultant DCKs (DCK1 and DCK2) of each process are combined using the TB4 encryption algorithm, and the resulting DCK is used to communicate.

A diagram showing a key pull within a communication system is shown in FIG. 10. The key pull procedure is used to forward an air interface key, typically the DCK, although the process may also be used for GCK/MGCK, into a BS that does not have the DCK for a mobile station. This situation may occur when an MS switches sites while idle or a failure arises. FIG. 10 shows MS1 401 switching from site 1 to site 2 within zone 1 and MS2 403 roaming from zone 2 to zone 1. Although KS, KS', and DCK are stored encrypted at the HLR, and DCK is stored encrypted at the HLR and VLR in the preferred embodiment, they are shown unencrypted in FIG. 10 for the sake of simplicity.

MS1 401 has roamed from site 1 to site 2 in zone 1. The pull procedure is initiated by the BS 117 when it recognizes that it does not have the DCK for the MS 401 that has sent an encrypted message, for example, a DCK-encrypted location update message. The BS 117 may optionally forward an acknowledgment of receipt of the encrypted message to the mobile station 401. The identity, ITSI1, of the MS 401 is encrypted with CCK, so the BS 117 is able to determine which MS has sent the message, even though it does not have DCK1 for the MS 401. The BS 117 requests the DCK1 from the ZC 107. The ZC 107 determines if it needs to request DCK1 from a different zone. In this case, because MS1 401 is roaming within the same zone, DCK1 is found in the VLR 111, and the ZC 107 sends DCK1 to the BS 117 encrypted with the intrakey $KEK_{Z1}$. The BS 117 uses DCK1 to decrypt the location update message for MS1 401, and any subsequent message(s) from the MS 401, and forwards the location update to the ZC 107. In the preferred embodiment, the VLR 111 for the MS 401 is not updated with the MS location until the MS implicitly authenticates or performs a full authentication. Receipt of a properly decrypted location update message is considered an implicit authentication, at which time the VLR 111 would be updated.

MS2 403 has roamed from zone 2 to zone 1. The pull procedure is initiated by the BS 115 when it recognizes that it does not have the DCK for the MS 403 that has sent an encrypted message, for example, a DCK-encrypted location update message. The BS 115 may optionally forward an acknowledgment of receipt of the encrypted message to the mobile station 403. The identity, ITSI2, of the MS 403 is encrypted with CCK, so the BS 115 is able to determine which MS has sent the message, even though it does not have DCK2 for the MS 403. The BS 115 requests the DCK2 from the ZC 107. The ZC 107 determines if it needs to request DCK2 from a different zone, which is required in this case, because MS2 403 is roaming from a different zone, zone 2, and the HLR 123 for the MS 403 is in zone 2. The ZC 107 determines which zone has the needed key material and sends a request to that target zone for the key material. In the example, DCK2 is found in the HLR 123 for zone 2, which is the target zone, and DCK2 is sent to the ZC 107 from that zone's HLR 123 after being encrypted with interkey, $KEK_M$. The ZC 107 sends DCK2 to the BS 115 encrypted with the intrakey $KEK_{Z1}$. The BS 115 uses DCK2 to decrypt the location update message for MS2 403, and any subsequent message(s) from the MS 403, and forwards the location update to the ZC 107. RS, KS, KS' are requested at a later time from the HLR 123 so that a full authentication may be performed as necessary. In the preferred embodiment, the VLR 111 for the MS 403 is not updated with the MS location until the MS implicitly authenticates or performs a full authentication. Receipt of a properly decrypted location update message is considered an implicit authentication, at which time the VLR 111 would be updated.

In the situation where it may be desired to pull a GCK/MGCK, the process is the same as described above with respect to the DCK, except that the VLR 111 obtains the GCK, combines it with a CCK, as described below in FIG. 15 and its associated text, and forwards the resultant MGCK, encrypted with the intrakey $KEK_{Z1}$, to the BS 115 or 117.

Figure 11:
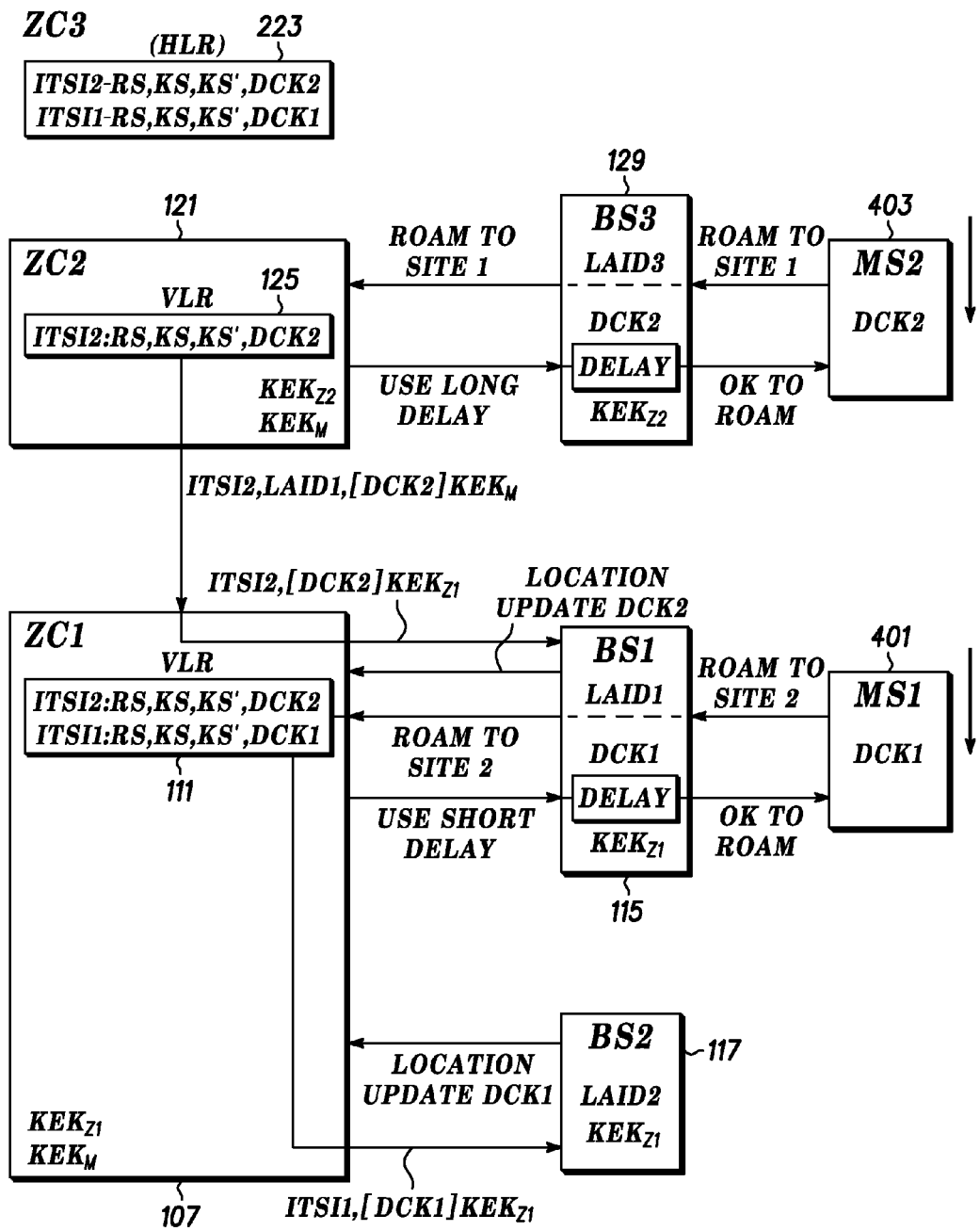
FIG. 11 is a diagram showing a key push within a communication system in accordance with the invention.

A diagram illustrating a key push within a communication system is shown in FIG. 11. The key push procedure is used to forward a key, such as the DCK or GCK/MGCK, to a forwarding site when an MS switches sites from its current site to the forwarding site. This process thus provides a mechanism for a key to be forwarded to a site prior to the arrival of the MS 401 or 403, so that seamless encrypted handoffs and roaming may occur. FIG. 11 shows an example of a transfer of DCK2 between zones and a transfer of DCK1 within a zone. The MS initiates the procedure. Although KS, KS', and DCK are stored encrypted at the HLR, and DCK is stored encrypted at the HLR and VLR in the preferred embodiment, they are shown unencrypted in FIG. 11 for the sake of simplicity.

MS1 401 begins the process of roaming from BS1 115, having Location Area Identification 1 (LAID1), at site 1 to BS2 117, having Location Area Identification 2 (LAID2) at site 2 at zone 1. The MS 401 sends to BS1 115 a message indicating that MS1 will roam to site 2. In the preferred embodiment, this message is an OTAR Prepare message. The BS 115 relays this message to the ZC 107. The ZC 107 determines if the DCK needs to be transferred to another zone or not by determining whether or not the site to which the MS 401 is roaming is in its zone or not. In this example, site 2 is also serviced by the ZC 107, thus there is no need to transfer the DCK to another zone. Because the DCK is transferred within the zone, the ZC 107 responds to the BS 115 with a use short delay message. In this case, the BS 115 holds off the MS 401 from switching to site 2 by a delay equivalent to the short delay, which delay approximates the time it will take to forward DCK to the next site from the VLR 111 in the same zone. In the preferred embodiment, the short delay is less than 50 ms. The MS 401 waits for an ok from the BS 115 before operating at the new site, e.g., roaming, switching sites, or communicating, and the BS 115 sends the ok after the short delay period expires. During the delay period, the VLR 111 at ZC1 107 encrypts DCK1 with the intrakey and forwards it to BS2 117 at site 2, where the MS 401 and BS2 117 will be able to exchange encrypted messages using DCK1. In the preferred embodiment, the VLR 111 for the MS 401 is not updated with the MS location until the MS 401 implicitly authenticates or performs a full authentication.

MS2 403 begins the process of roaming from BS3 129, having Location Area Identification 3 (LAID3) at site 3 at zone 2 to BS1 115, having Location Area Identification 1 (LAID1) at site 1 at zone 1. The MS 403 sends to BS3 129 a message indicating that MS2 will roam to site 1. In the preferred embodiment, this message is an OTAR Prepare message. The BS 129 relays this message to the ZC 121. The ZC 121 determines if the DCK needs to be transferred to another zone or not by determining whether or not the site to which the MS 401 is roaming is in its zone or not. In this example, site 1 is not serviced by the ZC 121, thus there is a need to transfer the DCK to another zone. Because the DCK is transferred to another zone, the ZC 121 responds to the BS 129 with a use long delay message. In this case, the BS 129 holds off the MS 403 from switching to site 1 by a delay equivalent to the long delay, which delay approximates the time it will take to forward DCK from the VLR 111 to the site in the next zone. In the preferred embodiment, the long delay is greater than or equal to 50 ms. The MS 403 waits for an ok from the BS 129 before switching sites, and the BS 129 sends the ok after the long delay period expires. During the delay period, the VLR 125 at ZC1 121 encrypts DCK2 with the interkey and forwards it to ZC1 107, which decrypts it with the interkey, encrypts it with the intrakey $KEK_{Z1}$, and forwards the result to BS1 115 at site 1, where the MS 403 and BS2 115 will be able to exchange encrypted messages using DCK2. In the preferred embodiment, the VLR 111 for the MS 403 is not updated with the MS location until the MS 403 implicitly authenticates or performs a full authentication, at which time the VLR 125 for MS2 in ZC2 121 is eliminated. RS, KS, KS' are requested at a later time from the HLR at ZC3 223 (the home zone HLR for the MS 403) so that a full authentication may be performed as necessary.

Figure 12:
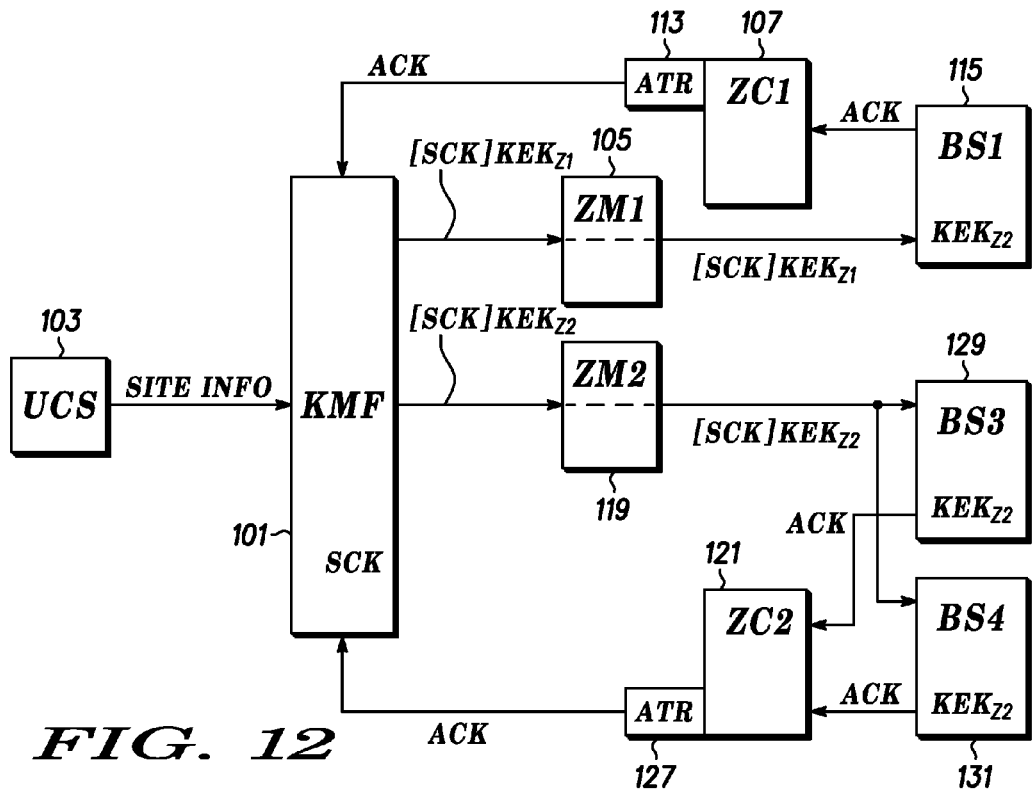
FIG. 12 is a diagram showing distribution of a static cipher key to a base station within a communication system in accordance with the invention.

FIG. 12 is a diagram showing distribution of a static cipher key to a BS within a communication system. The SCK is a system wide voice traffic key that is used to encrypt voice, data, ESI (encrypted short identity), and signaling traffic when authentication is not available. SCKs are identified by SCKN and SCK-VN, and are stored in the KMF 101 encrypted by a hardware key and in the ZMs 105 and 119 encrypted by TA31. In the preferred embodiment, there may be up to 32 distinct SCKs in the entire system. Each BS stores one SCK, identified by SCK number (SCKN), each of which has an SCK version number (SCK-VN), although SCK may have multiple versions that are or were used in the system. Each SCKN has a version number SCK-VN, and in the preferred embodiment, two version numbers, i.e., two keys, are stored for each SCKN. The MS must be able to store 32 SCKs for one SCK-VN, in addition to 32 SCKs for another SCK-VN. The 31 additional SCKs in the MS are defined for direct operation between mobile stations. A new SCK replaces the oldest SCK-VN. The SCK may be provided to BSs and mobile stations in several ways, including via a Key Variable Loader (KVL), via computer software such as RSS Software available from Motorola, Inc., and via OTAR (Over-the-Air Rekeying) via the home zone ATR of the MS. Although not shown in the drawing because of space constraints, SCKN and SCK-VN are sent along with SCK for identification purposes.

A process to transfer an SCK to each BS in the system is shown in FIG. 12. When the KMF 101 determines that an SCK update is due, the KMF 101 generates a new SCK. In order to determine the home zone of a BS, in the preferred embodiment, the KMF 101 uses the BS to home ZC map from the UCS 103 and a table lookup based on the zone to obtain the address for the ATR in the zone. The KMF 101 encrypts the SCK with the intrakey, $KEK_Z$, for the zone in which the BS is located, and sends the encrypted key to the ZM for that BS. The ZM stores a copy and forwards it to the intended BS. An unencrypted ACK is sent from the BS to the ZC and to the KMF 101 via the ATR in the zone where the BS resides. The ACK represents that the SCK was received correctly in the BS.

A specific example of an SCK transfer to BS1 115 includes a transfer of site information, including an BS to home zone controller map, from the UCS 103 to the KMF 101. The KMF 101 uses the map to determine that BS1 115 is located in zone 1. The KMF 101 generates the SCK and encrypts it with the intrakey, $KEK_{Z1}$, for zone 1 where BS is located. The KMF 101 forwards the encrypted SCK to the ZM 105 for zone 1. ZM1 105 stores a copy of the encrypted SCK and forwards it to BS1 115 via a wireline link. BS1 115 decrypts the encrypted SCK using $KEK_{Z1}$ and stores the SCK unencrypted. When the SCK is received correctly by BS1, BS1 115 sends an unencrypted ACK to the KMF 101 via ZC1 107 and the ATR 113 in zone 1. Transfers of SCK to BS3 and BS4 are similarly performed.

Figure 13:
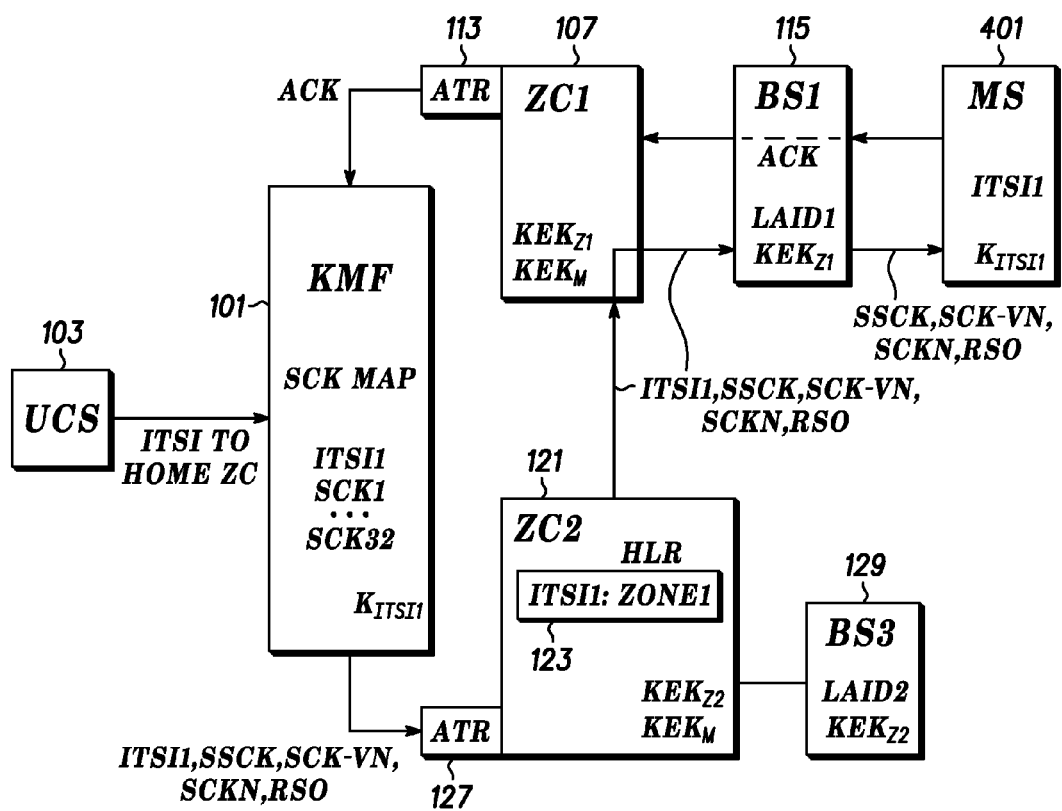
FIG. 13 is a diagram showing distribution of a static cipher key to a mobile station within a communication system in accordance with the invention.

A diagram showing distribution of a static cipher key to a mobile station within a communication system is shown in FIG. 13. When the KMF 101 determines that an SCK update for an MS 401 is due, the KMF 101 generates a new SCK key material for the MS 401 according to FIG. 10 titled "Distribution of SCK to an individual by an authentication center" and its associated text in the TETRA Standard. The SCK generation process yields the key material SSCK (a sealed SCK), SCKN (SCK number), SCK-VN (SCK version number), and RSO (the random seed used in the process). In order to determine the ATR for the home zone of the MS 401, in the preferred embodiment, the KMF 101 uses the ITSI to home ZC map from the UCS 103 and a table lookup based on the zone to obtain the address of the ATR for the home zone. In the example of FIG. 13, the home zone for MS1 401 is zone 2. The KMF 101 forwards SSCK, SCKN, SCK-VN, and RSO to the ATR 127 of the home zone (2) for the MS 401. If the MS 401 is not on the system, the ATR 127 sends a NACK back to the KMF 101. If the MS 401 is on the system, the SCK is delivered to the MS 401 via the zone in which the MS 401 is currently located. In the preferred embodiment, the SCK key material (e.g., SSCK, SCKN, SCK-VN, and RSO) are not encrypted for transfer among system devices. The SCK key material may optionally be encrypted for transfer among system devices.

When the MS 401 is not located in its home zone, the home zone controller 121 of zone 2 determines which zone the MS 401 is currently located in (zone 1 in FIG. 12) by looking it up in the HLR 123 of zone 2. ZC2 121 forwards SSCK, SCKN, SCK-VN, and RSO to the zone controller 107 of the zone where the MS 401 is presently located. ZC1 107 forwards SSCK, SCKN, SCK-VN, and RSO to the BS 115 where the MS 401 is located. The BS 115 decrypts the SSCK, SCK-VN, and RSO with the intrakey, $KEK_{Z1}$, and forwards the result to the MS 401. An unencrypted ACK is sent from the MS 401 to the BS 115 to the ZC 107 and to the KMF 101 via the ATR 113 in the zone where the BS 115 resides. The ACK represents that the SCK was received and unsealed correctly in the MS (the unsealing process is described in the TETRA Standard).

When the MS 401 is located in its home zone (not shown, but assumed to be at BS3 129 for the sake of this example), the VLR of the home zone controller 121 forwards SSCK, SCKN, SCK-VN, and RSO to the BS 129 where the MS 401 is located (not shown but assumed for this example). The BS 129 forwards SSCK, SCKN, SCK-VN, and RSO to the MS 401. An unencrypted ACK is sent from the MS 401 to the BS 129 to the ZC 121 and to the KMF 101 via the ATR 127 in the zone where the BS 115 resides. The ACK represents that the SCK was received and unsealed correctly in the MS (the unsealing process is described in the TETRA Standard).

Figure 14:
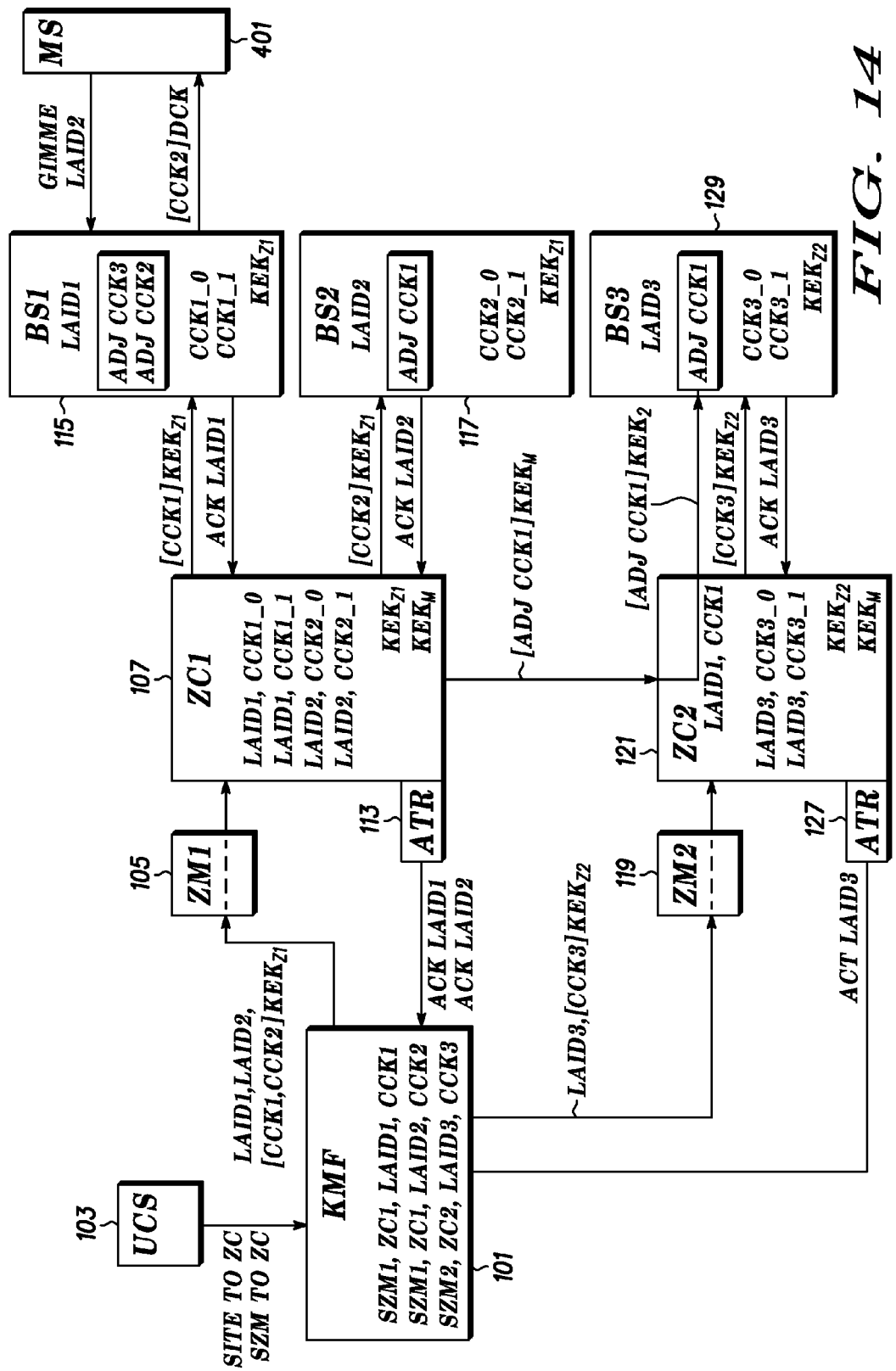
FIG. 14 is a diagram showing distribution of a common cipher key to a mobile station and a base station within a communication system in accordance with the invention.

FIG. 14 is a diagram showing distribution of a common cipher key to a mobile station and a BS within a communication system. The CCK is a location area based traffic key that is used to encrypt voice, data, and signaling within a location area (LA) and is only used for outbound communications. The CCK is meant for use with the encryption of group call traffic in the TETRA Standard. The CCK is also used to encrypt the subscriber identity creating the encrypted short identity (ESI). Group call traffic within the LA uses the CCK when there is no GCK available or it is disabled. There is one CCK per location area. A location area may be a small as a site, thus there could be as many as CCKs as sites in the system. It is possible for more than one location area to have the same CCK. CCK is identified by CCK-ID (e.g., CCK1, CCK2, and so forth) and LAID (location area identification). Two copies of each CCK (the latest two CCK-IDs) are in the ZC and the BS to enable a gradual rekeying of the MS in the system. While one CCK is in use, the next one is distributed to the MS. In the preferred embodiment, each site maintains a CCK for each site adjacent to the site for seamless handoffs between sites and to facilitate consistent mobility management. When an adjacent CCK is given to an MS, the latest two CCKs are transferred to the MS. A new CCK replaces the oldest CCK-ID. Long term storage of CCKs occurs in the ZMs 105 and 119. The TETRA Standard supports several methods to provision CCK over-the-air, and the same request/provide methodology used for each of the air interface keys, and also allows key request upon registration and cell change by the mobile station.

The CCK to BS procedure illustrated in FIG. 14 is used to transfer a CCK from the KMF 101 to a BS (site) 115. The KMF 101 determines that it is time for the CCK of a BS 115 to be updated and generates appropriate CCK(s). In the preferred embodiment, each BS is a Location Area (LA) and has its own Location Area Identification (LAID). FIG. 14 shows the transfer of CCK1 and CCK2 to zone 1 and the transfer of CCK3 to zone 2. The CCKs are encrypted with the intrakey, $KEK_Z$, for the zone where the LA is located. The UCS 103 provides a site-to-zone map and an ZM-to-zone map to the KMF 101. The KMF 101 uses these maps to send the keys directly to the appropriate ZM 105 or 119, which stores CCK and forwards CCK to the zone controller 107 or 121. The UCS 103 obtains the site parameters from the ZMs 105 and 119 to create the adjacent site list that is sent to the KMF 101 and forwarded the ZMs 105 and 119 to be forwarded to the zone controllers 107 and 121 for use. If an adjacent site is in a different zone, the key is transferred between the involved ZCs. The ZC encrypts the CCK with the interkey, $KEK_M$, for transfer between zone controllers. Using the adjacent site list, the zone controllers 107 and 121 send the adjacent site CCKs to the appropriate sites. Thus, each site on the adjacent site list will have the CCKs for sites adjacent to that site. The adjacent CCKs are used so that the MS may request the CCK for the adjacent site before the MS switches sites. The BS 115 may also forward CCKs to MSs as new CCKs are received at the BS 115. CCKs are encrypted with DCK for the particular MS 401 prior to transmitting the encrypted CCK to the MS 401. ACKs are sent by the BS to ZC and are returned to the KMF 101 via the ATR (where the BS resides). Because the KMF 101 is unaware of adjacency, it does not need ACKs from adjacent distributions of CCK. Because the KMF 101 tracks which BS is given a CCK, the BS tracks the currency of the CCKs, i.e., which MS has a CCK for a given Location Area, and forwards ACKs once the CCK is current.

Figure 15:
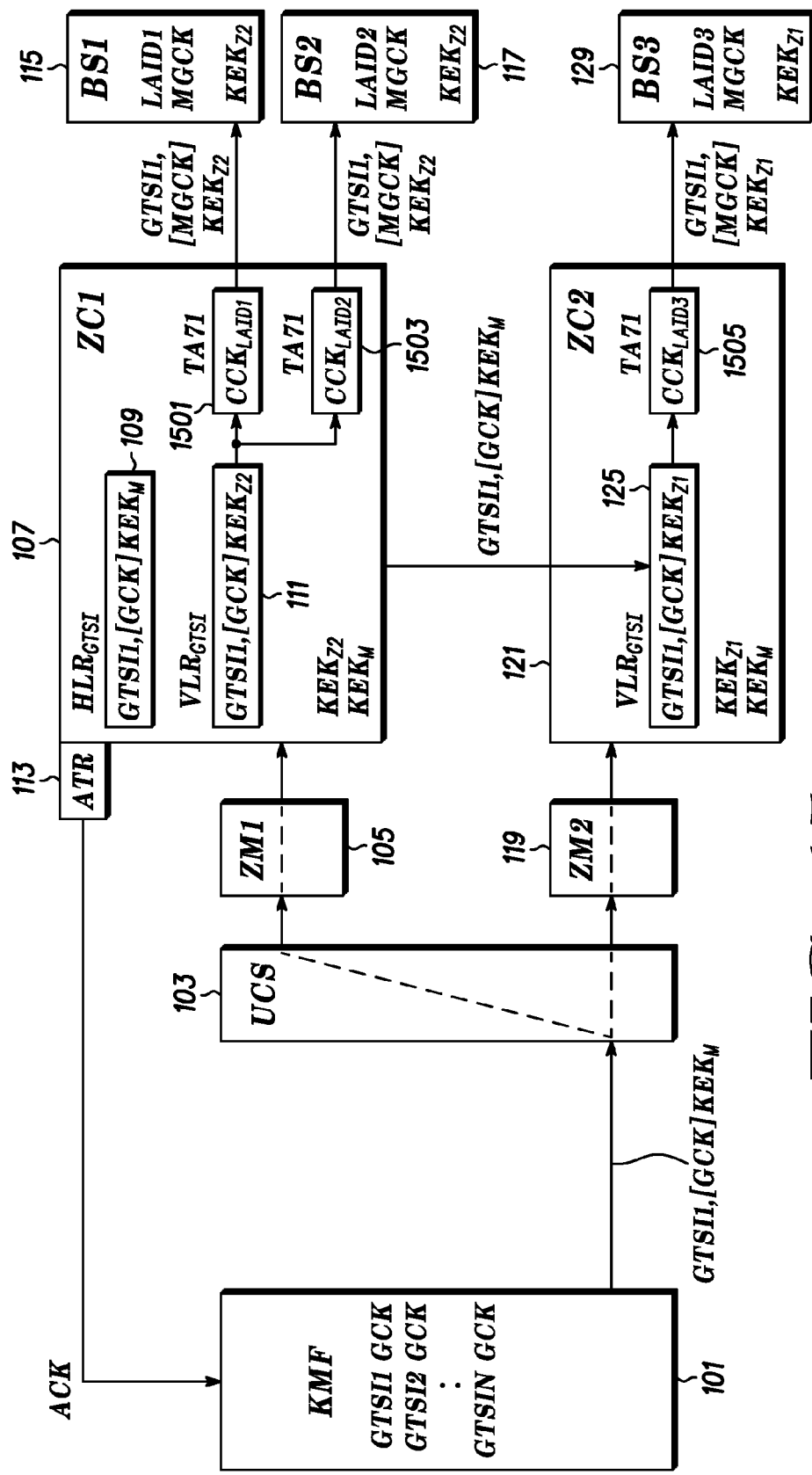
FIG. 15 is a diagram showing distribution of a group cipher key to a base station within a communication system in accordance with the invention.
Figure 16:
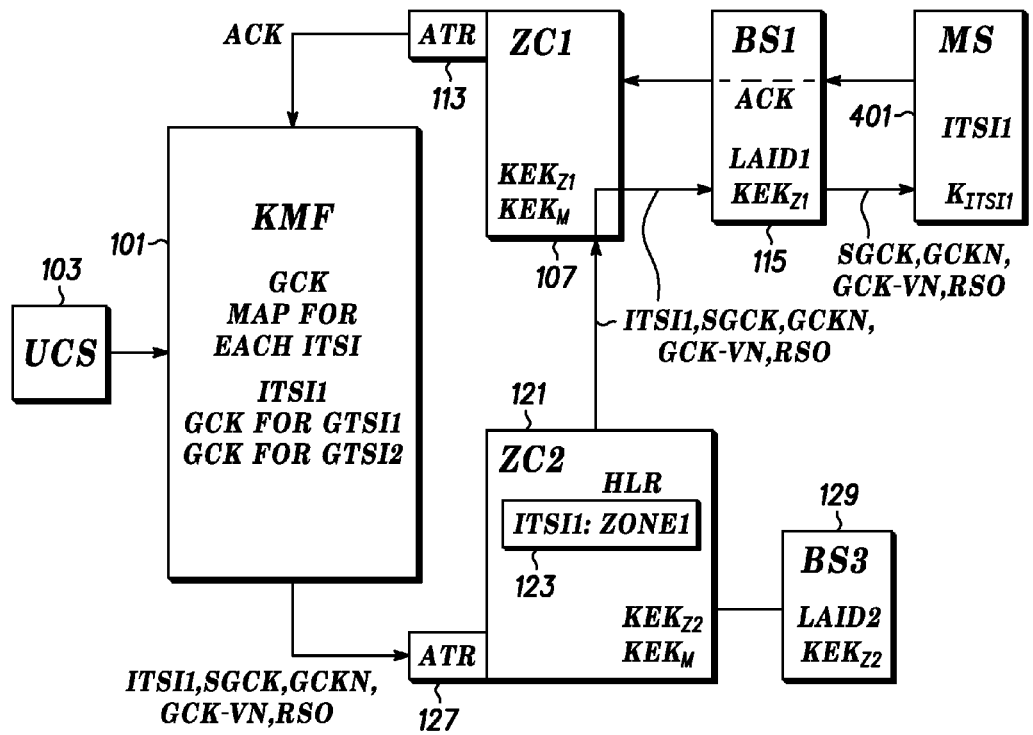
FIG. 16 is a diagram showing distribution of a group cipher key to a mobile station within a communication system in accordance with the invention.

Because MGCK is a combination of CCK and GCK, the zone controller will create four MGCKs using the latest two CCK-IDs and the latest two GCK-VNs and distribute them accordingly (see FIG. 15 and FIG. 16).

The CCK is a zone specific parameter so there is no need to go through the UCS 103. Thus, the KMF 101 sends the CCK information directly to the appropriate zone manager 105 or 119, which is different than the re-keying methodology of other air interface keys. The UCS 103 obtains the site information from the zone managers 105 or 119 to create the adjacent site list. By placing CCKs at adjacent sites, real-time processing of CCKs is reduced, i.e., the BS does not need to query the zone controller for the CCK for an adjacent BS when an MS requests a CCK for a neighboring site, thus the MS need not process a CCK when the MS switches sites.

FIG. 15 is a diagram showing distribution of a group cipher key to a BS within a communication system. GCK is identified by GTSI (Group TETRA Subscriber ID as referred to in the TETRA standard) and GCK-VN. In the preferred embodiment, GCKN is logically equivalent to GTSI from a key management perspective. Long term storage of GCK occurs in the UCS and ZM. MGCK, which is a combination of GCK and CCK, is identified by GTSI (or GCKN), CCK-ID (with LAID), and GCK-VN. Four MGCKs per talkgroup (GTSI) are identified by the latest two CCK-Ids and the latest two GCK-VNs. MGCKs are not stored in a ZC 107 or 121, but are created by a ZC 107 or 121 and sent to the BS 115 provided that an MS affiliated with that GTSI is at the site of the BS 115, which does not receive the GCK because it is a long-term key. Although not shown in the drawing because of space constraints, GCK-VN is sent along with GCK and MGCK for identification purposes.

The procedure to update a GCK for a talkgroup record has two parts. The first part includes updating the actual GCK in the for the talkgroup, the second part includes generating the resultant MGCK as a result of the update and distributing the MGCK to the sites.

The procedure of FIG. 15 transfers a GCK from the KMF 101 to the talkgroup HLR in the zone controller at the home zone for the talkgroup. When the KMF 101 determines that it is time for the GCK to be updated, the KMF 101 generates a GCK for each talkgroup and maintains a GTSI-GCK table. The GCKs are stored hardware encrypted at the KMF 101. The KMF 101 does not know which ZC has the HLR for the GTSI, so the KMF 101 sends the GCK encrypted with the interkey, $KEK_M$, to the UCS 103. The UCS 103 stores the key material and forwards it to the home ZM 105 or 119 for the talkgroup (GTSI) associated with the GCK. The ZM 105 or 119 forwards the key material to its ZC 107 or 121, which stores the key material in the group HLR for GTSI encrypted by $KEK_M$. The ZC 107 verifies that the key material can be decrypted correctly and sends an ACK back to the KMF 101 via the ATR 113 where the group HLR 109 for GTSI resides. The ACK reflects that the HLR 109 contains a correct encrypted copy of the GCK. The ZC 107 decrypts the key material with $KEK_M$ and re-encrypts it with the intrakey, $KEK_Z$, for storage in the VLR 111. Any other VLRs, such as VLR2 125, outside of the home zone associated with the GTSI will have GCK encrypted with $KEK_M$ forwarded to them. FIG. 15 shows both the inter-zone and intra-zone cases.

Because MGCK is a combination of GCK and CCK generated by a ZC using the TA71 algorithm 1501, 1503, or 1505, when GCK changes or CCK changes, the MGCK must also change accordingly. The four MGCKs are sent to all sites having a talkgroup affiliation matching the GTSI for GCK. Because the latest 2 CCK-IDs and latest 2 GCK-VNs are stored, four versions of the MGCK need to be sent to the BS.

As in other cases, when sending MGCK to a site, it needs to be encrypted using the intrakey, $KEK_Z$ The GCK is obtained from the VLR talkgroup record and decrypted with the intrakey, $KEK_Z$, and combined with CCK to create MGCK. The resultant MGCK is encrypted using the intrakey, $KEK_Z$, and sent to the appropriate sites.

Transfer of an MGCK to a BS may be triggered by a number of events. Examples of triggers include a mobile station associated with the GCK for the MGCK residing at the BS when the either the GCK or CCK is generated; a mobile station arriving at the BS when no previous talkgroup affiliation at that BS had occurred; and a mobile station changing talkgroup affiliation, while residing at the BS, to a talkgroup not previously associated with the BS.

A diagram showing distribution of a group cipher key to a mobile station within a communication system is shown in FIG. 16. When the KMF 101 determines that an GCK update for an MS 401 is due, the KMF 101 generates a new GCK key material for the MS 401 according to FIG. 8 titled "Distribution of a group cipher key to an individual" and its associated text in the TETRA Standard. The GCK generation process yields the key material SGCK (a sealed GCK), GCKN (GCK Number), GCK-VN (GCK version number), and RSO (the random seed used in the process). In order to determine the ATR for the home zone of the MS 401, in the preferred embodiment, the KMF 101 uses the ITSI to home ZC map from the UCS 103 and a table lookup based on the zone to obtain the address of the ATR for the home zone. In the example of FIG. 16, the home zone for MS1 401 is zone 2. The KMF 101 forwards SGCK, GCKN, GCK-VN, and RSO to the ATR 127 of the home zone (2) for the MS 401. If the MS 401 is not on the system, the ATR 127 sends a NACK back to the KMF 101. If the MS 401 is on the system, the GCK is delivered to the MS 401 via the zone in which the MS 401 is currently located. In the preferred embodiment, the GCK key material (e.g., SGCK, GCKN, GCK-VN, and RSO) are not encrypted for transfer among system devices. The GCK key material may optionally be encrypted for transfer among system devices.

When the MS 401 is not located in its home zone, the home zone controller 121 of zone 2 determines which zone the MS 401 is currently located in (zone 1 in FIG. 16) by looking it up in the HLR 123 of zone 2. ZC2 121 forwards SGCK, GCKN, GCK-VN, and RSO to the zone controller 107 of the zone where the MS 401 is presently located. ZC1 107 forwards SGCK, GCKN, GCK-VN, and RSO to the BS 115 where the MS 401 is located. The BS 115 forwards SGCK, GCKN, GCK-VN, and RSO the MS 401. An unencrypted ACK is sent from the MS 401 to the BS 115 to the ZC 107 and to the KMF 101 via the ATR 113 in the zone where the BS 115 resides. The ACK represents that the GCK was received and unsealed correctly in the MS (the unsealing process is described in the TETRA Standard).

When the MS 401 is located in its home zone (not shown, but assumed to be at BS3 129 for the sake of this example), the home zone controller 121 forwards SGCK, GCKN, GCK-VN, and RSO to the BS 129 where the MS 401 is located (not shown but assumed for this example). The BS 129 forwards SGCK, GCKN, GCK-VN, and RSO to the MS 401. An unencrypted ACK is sent from the MS 401 to the BS 129 to the ZC 121 and to the KMF 101 via the ATR 127 in the zone where the BS 115 resides. The ACK represents that the GCK was received and unsealed correctly in the MS (the unsealing process is described in the TETRA Standard).

Figure 17:
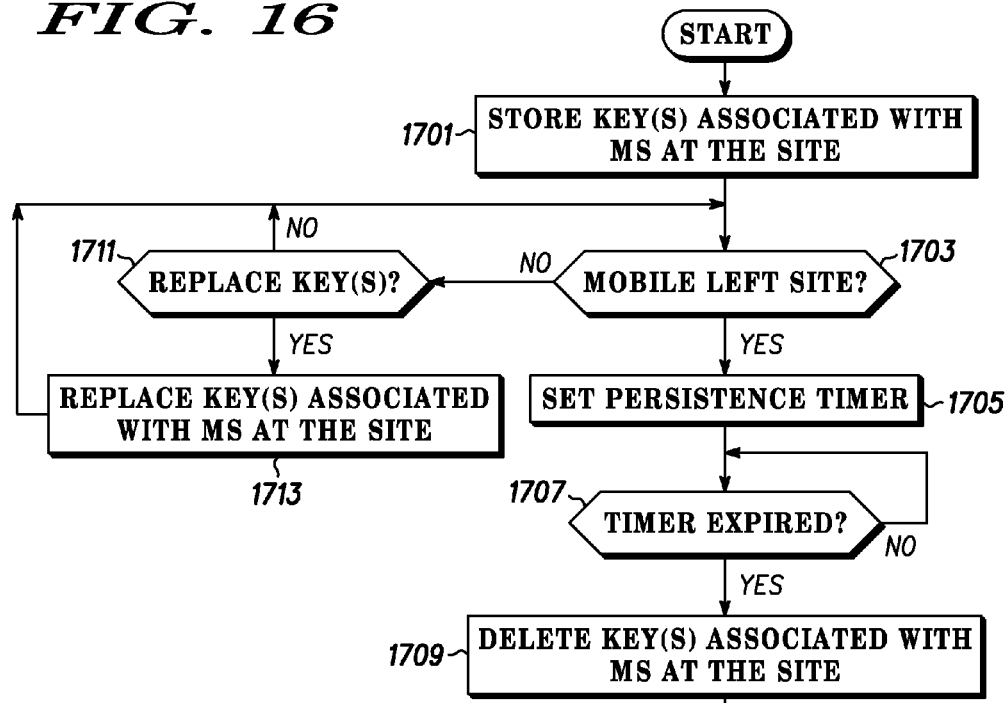
FIG. 17 is a flowchart showing a method of key persistence at a site in a communication system in accordance with the invention.

FIG. 17 is a flowchart showing a method of key persistence at a site in a communication system in accordance with the invention. Key persistence refers to the time a key remains stored at any system device or MS. If an air interface traffic key is deleted from a site when the MS leaves the site, and the key is removed too quickly, the MS may return to the site requiring the key to be set up again. If the MS is traveling between zone borders or site boundaries for a period of time, the key material for the MS may need to be constantly set up if the key material is deleted from a site too quickly after the MS leaves the site. If the key material is left at a site for too long, duplicate keys may be set up, creating ambiguity and the likelihood of authentication failures, particularly for implicit authentication. Thus, the key persistence for each key needs to be set adequately to prevent such problems. In the preferred embodiment, the persistence time is based on an expected average authentication rate in the communication system, and preferably the persistence time is less than the expected average authentication rate in the communication system. The expected average authentication rate is based on an average number of times a mobile station authenticates within a time period.

At step 1701, when a MS arrives at a site, key(s) and/or key material associated with the MS 401 are stored at the site. If at step 1703 it is determined that the mobile has left the site, a persistence timer is set at step 1705, unless it had already been set or reset, in which case the process simply continues with step 1709. When the timer expires at step 1707, the process continues with step 1709 where the key(s) and/or key material associated with the mobile 401 are deleted from the site, and the process ends. If the mobile 401 has not left the site at step 1703, and it is time to replace the mobile's key(s) and/or key material at step 1711, the key(s) and/or key material are replaced at step 1713 and the process continues with step 1703. Step 1709 may also be reached (not shown) if a system device, such as a zone controller, directs the site to delete certain key(s) and/or key material for any reason. The zone controller typically determines when the mobile leaves a site based on HLR and VLR updates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method in a communication system, the method comprising the steps of:

generating, by a first infrastructure system device other than a mobile station, key material comprising at least one air interface key used for encrypting air interface traffic between a base station and a mobile station, wherein the at least one air interface key comprises at least one of a group cipher key or a static cipher key;

forwarding the key material from the first infrastructure system device to a second infrastructure system device other than a mobile station;

determining whether or not a mobile station, for which the key material is directed, is active on the system, and;

upon determining that the mobile station is active, forwarding the key material which includes the at least one air interface key to a base station where the mobile station is active; and forwarding, by the base station, the key material which includes the at least one air interface key to the mobile station.

2. The method of claim 1 further comprising the step of encrypting the key material prior to any forwarding step.

3. The method of claim 1, wherein any of a base site and a TETRA site controller takes the place of the base station.

4. The method of claim 1, wherein the key material is forwarded from the first infrastructure system device to the second infrastructure system device via an air traffic router.

5. The method of claim 1, wherein the second infrastructure system device is at least one of a zone controller, a home location register and a visited location register.

6. The method of claim 1 further comprising the step of encrypting the key material using an intrakey prior to forwarding the key material within a first zone that includes the base station, wherein the intrakey is used only by infrastructure system devices other than a mobile station for encrypting at least the key material prior to transport within the first zone.

7. The method of claim 1 further comprising the step of encrypting the key material with an interkey prior to forwarding the key material from the first infrastructure system device to the second infrastructure system device, wherein the interkey is used only by infrastructure system devices other than a mobile station for encrypting at least the key material for transport between two different zones.

8. The method of claim 1 further comprising the step of acknowledging receipt of the key material.

9. The method of claim 8, wherein the step of acknowledging comprising decrypting the key material, and when the key material is decrypted properly, generating an acknowledgment to be forwarded via an air traffic router to the first infrastructure system device.

10. The method of claim 1 further comprising the step of updating the key material when an encryption period associated with the key material expires.

11. The method of claim 1 further comprising the steps of:

obtaining, by the mobile station, the air interface key from the key material;

combining the air interface key with a second encryption key, yielding a modified air interface key; and communicating over an air interface by encrypting messages with the modified air interface key.

12. The method of claim 11, wherein the modified air interface key is one of the group cipher key or the static cipher key, and the second encryption key is a common cipher key.

13. The method of claim 11 further comprising the step of updating the modified air interface key when an encryption period associated with the second encryption key expires.

14. The method of claim 1, wherein the step of forwarding the key material from the first infrastructure system device to the second infrastructure system device comprises the steps of:

forwarding the key material from the first infrastructure system device to a third infrastructure system device other than a mobile station; and forwarding the key material from the third infrastructure system device to the second infrastructure system device.

15. The method of claim 14 further comprising the steps of:

encrypting the key material with an interkey prior to forwarding the key material from the first infrastructure system device, wherein the interkey is used only by infrastructure system devices other than a mobile station for encrypting at least the key material for transport between two different zones; and decrypting, by the second infrastructure system device, the key material with the interkey.

16. The method of claim 1 further comprising the step of inhibiting forwarding of the at least one air interface key to the mobile station when the mobile station is not active.

17. The method of claim 1, wherein the at least one air interface key is encrypted prior to being forwarded.

18. The method of claim 1, further comprising the step of sending an acknowledgment of successful receipt of the at least one air interface key to an air traffic router via at least a zone controller.

* * * * *

UNITED STATES PATENT AND TRADEMARK OFFICE
CERTIFICATE OF CORRECTION

PATENT NO. : 7,840,009 B2
APPLICATION NO. : 11/781310
DATED : November 23, 2010
INVENTOR(S) : Sowa et al.

It is certified that error appears in the above-identified patent and that said Letters Patent is hereby corrected as shown below:

On the Cover Page, item (75), under "Inventors", in Column 1, Line 5, delete "Jason" and insert -- Jason J. --, therefor.

On the Cover Page, item (75), under "Inventors", in Column 1, Line 9, delete "Glen" and insert -- Glenn --, therefor.

In Column 2, Line 44, before "DESCRIPTION" insert -- DETAILED --.

In Column 8, Line 10, delete "(BS, ZC" and insert -- (BS, ZC) --, therefor.

In Column 14, Line 32, delete "VLRK" and insert -- VLR --, therefor.

In Column 14, Line 40, delete "VLRK" and insert -- VLR --, therefor.

In Column 14, Line 43, delete "VLRK" and insert -- VLR --, therefor.

In Column 18, Line 30, delete "BS" and insert -- BS1 --, therefor.

In Column 20, Lines 53-54, after "GCK" delete "in the".

In Column 21, Line 20, delete "$KEK_Z$" and insert -- $KEK_Z$. --, therefor.

In Column 22, Line 44, delete "mobile" and insert -- mobile station --, therefor.

In Column 22, Line 45, delete "mobile" and insert -- mobile station --, therefor.

Signed and Sealed this
Seventh Day of August, 2012

David J. Kappos
*Director of the United States Patent and Trademark Office*